United States Patent
Tian et al.

(10) Patent No.: US 6,339,651 B1
(45) Date of Patent: *Jan. 15, 2002

(54) ROBUST IDENTIFICATION CODE RECOGNITION SYSTEM

(75) Inventors: Qi Tian; Kong Wah Wan; Karianto Leman; Chade Meng Tan; Chun Biao Guo, all of Singapore (SG)

(73) Assignee: Kent Ridge Digital Labs, Singapore (SG)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,152

(22) Filed: Feb. 25, 1998

(30) Foreign Application Priority Data

Mar. 1, 1997 (SG) .......................................... 9700625-8

(51) Int. Cl.[7] ................................................ G06K 9/00
(52) U.S. Cl. ........................ 382/105; 382/159; 382/177; 382/209; 382/217; 382/218; 340/146.3 G; 340/933; 340/937; 340/825.34; 435/362
(58) Field of Search ................................ 382/156, 159, 382/177, 209, 217, 218, 105, 178, 179, 311; 340/146.3 G, 933, 937

(56) References Cited

U.S. PATENT DOCUMENTS

| | | | | |
|---|---|---|---|---|
| 3,213,420 A | * | 10/1965 | Eckert, Jr. ................... | 382/229 |
| 3,644,889 A | * | 2/1972 | Skenderoff et al. .. | 340/146.3 G |
| 3,979,722 A | * | 9/1976 | Sakoe ......................... | 382/215 |
| 4,817,166 A | * | 3/1989 | Gonzalez et al. ........... | 382/105 |
| 4,850,025 A | * | 7/1989 | Abe ............................. | 382/177 |
| 4,878,248 A | * | 10/1989 | Shyu et al. .................. | 382/105 |
| 5,033,097 A | * | 7/1991 | Nakamura ................... | 382/177 |
| 5,081,685 A | * | 1/1992 | Jones, III et al. ........... | 382/105 |
| 5,136,658 A | * | 8/1992 | Mori ........................... | 382/105 |
| 5,212,739 A | * | 5/1993 | Johnson ........................ | 382/9 |
| 5,251,268 A | * | 10/1993 | Colley et al. ................ | 382/14 |
| 5,315,664 A | * | 5/1994 | Kumagai ....................... | 382/1 |
| 5,321,770 A | * | 6/1994 | Huttenlocher et al. ...... | 382/229 |
| 5,425,108 A | * | 6/1995 | Hwang et al. ............... | 382/105 |
| 5,915,032 A | * | 6/1999 | Look ............................ | 382/100 |
| 6,026,177 A | * | 2/2000 | Mong et al. ................. | 382/156 |

OTHER PUBLICATIONS

Mei Yu et al.: An Approach to Korean License Plate Recognition Based on Vehicle Edge matching, 2000 IEEE Intern'l conf. vol. 4, pp. 2975–2980.*

Sang K. Kim et al.: A recognition of Vehicle license plate using a genetic Algorithm Based Segmentation, 1996 IEEE, proceedings, Intern'l Conf., vol.2, pp. 661–664.*

* cited by examiner

Primary Examiner—Thomas Black
Assistant Examiner—Jacques Veillard
(74) Attorney, Agent, or Firm—Greenblum & Bernstein, P.L.C.

(57) ABSTRACT

A method and system for recognizing the characters on surfaces where alphanumeric identification code ("ID" for short) may be present such as a license plate. The present system is particularly adapted for situations where visual distortions can occur, and utilizes a highly robust method for recognizing the characters of an ID. Multiple character recovery schemes are applied to account for a variety of conditions to ensure high accuracy in identifying the ID. Accuracy is greatly enhanced by taking a comprehensive approach where multiple criteria are taken into consideration before any conclusions are drawn. Special considerations are given to recognizing the ID as a whole and not just the individual characters.

20 Claims, 23 Drawing Sheets

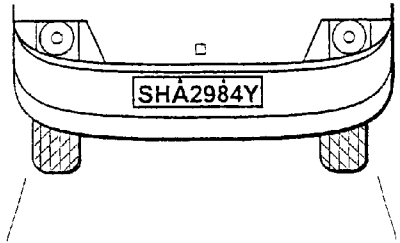
FIG. 14.1
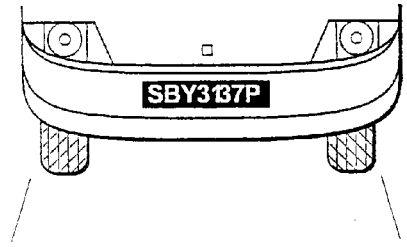
FIG. 14.2
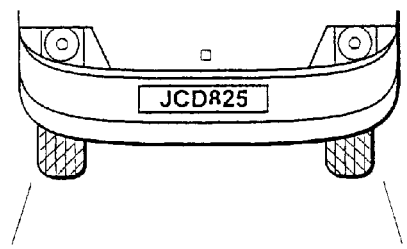
FIG. 14.3
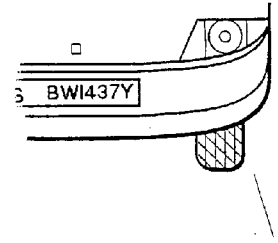
FIG. 14.4

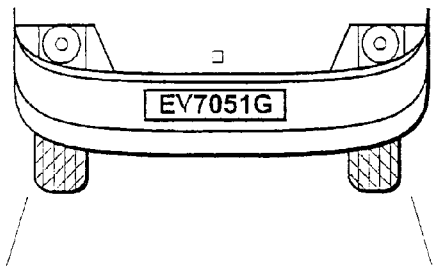 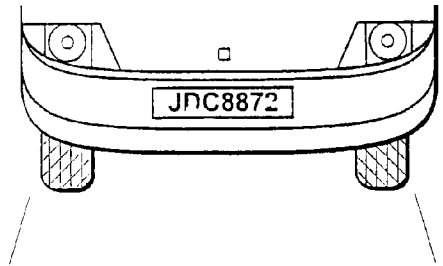
FIG. 14.5    FIG. 14.6
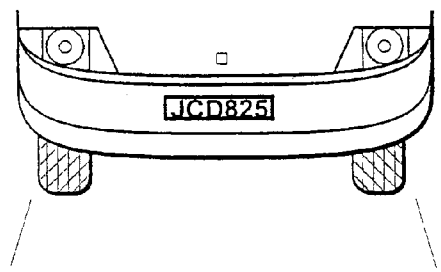 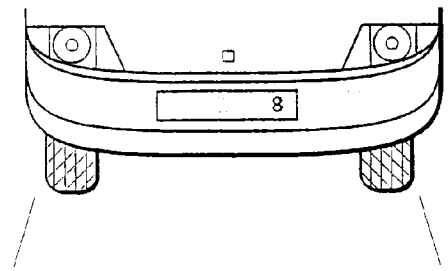
FIG. 14.7    FIG. 14.8

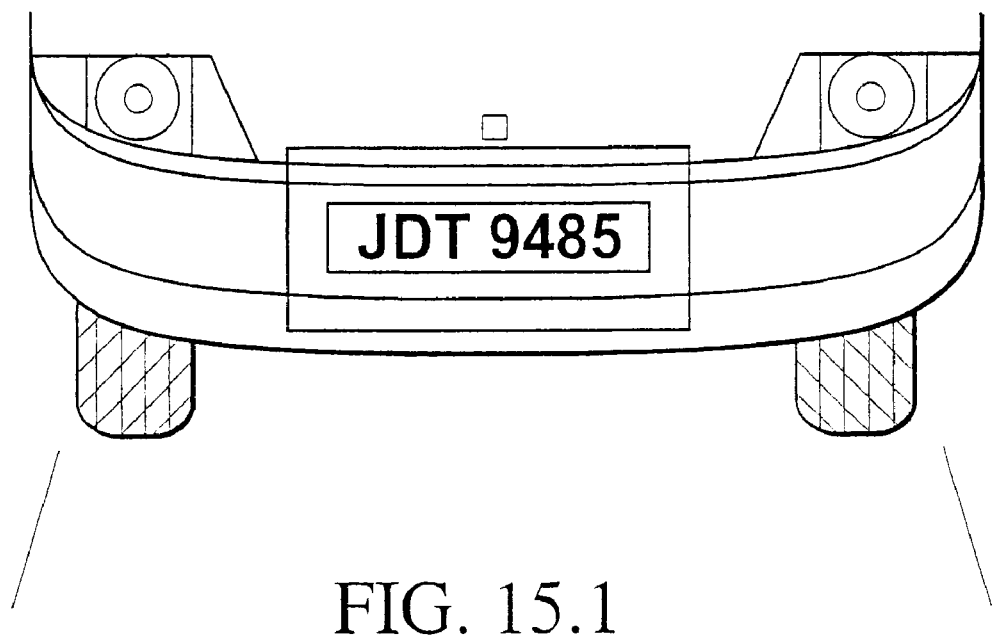
FIG. 15.1

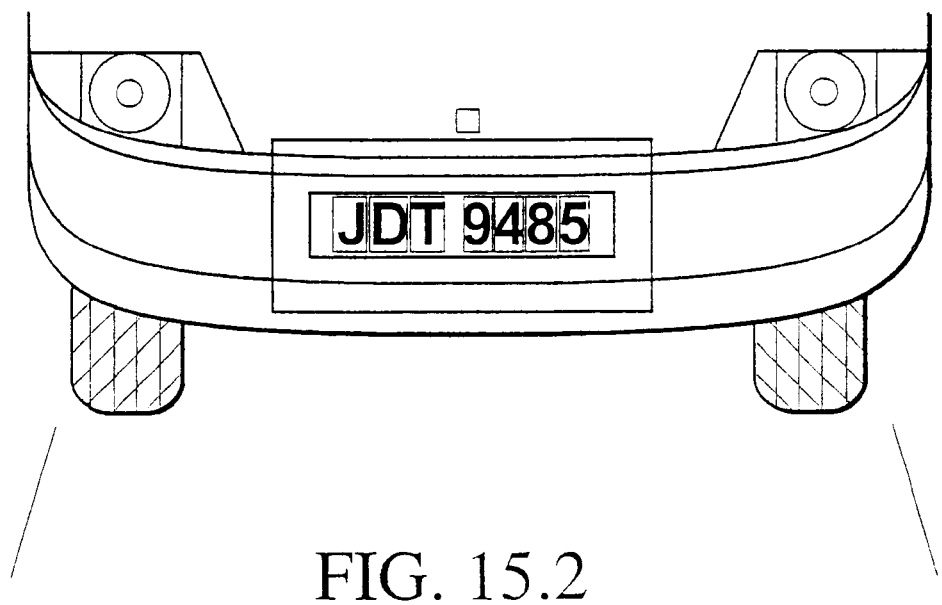
FIG. 15.2

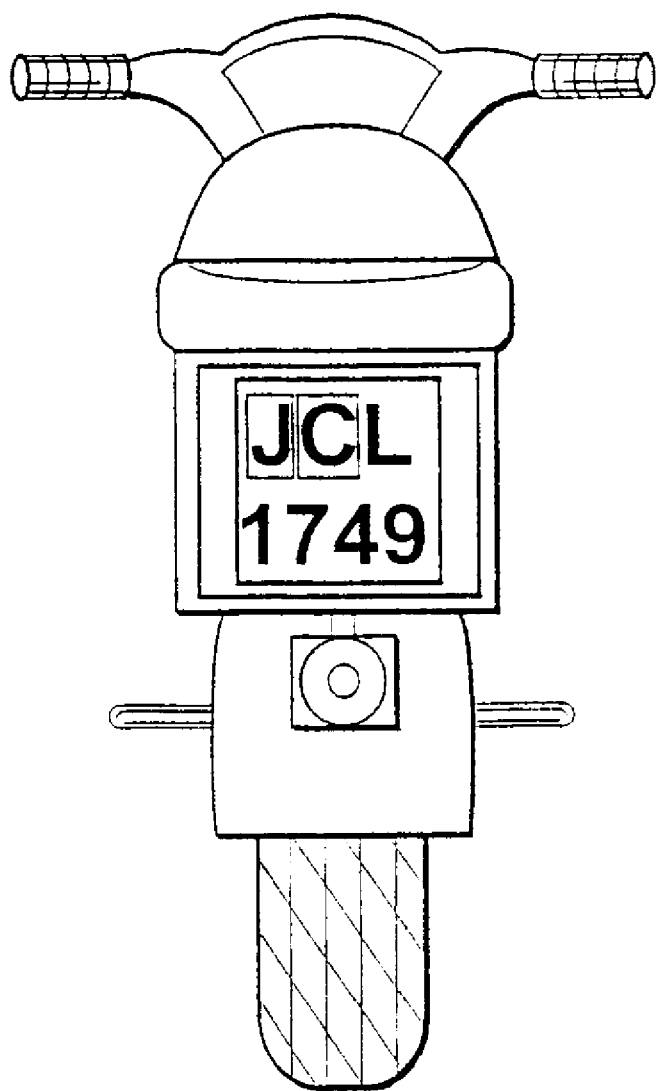
FIG. 15.3

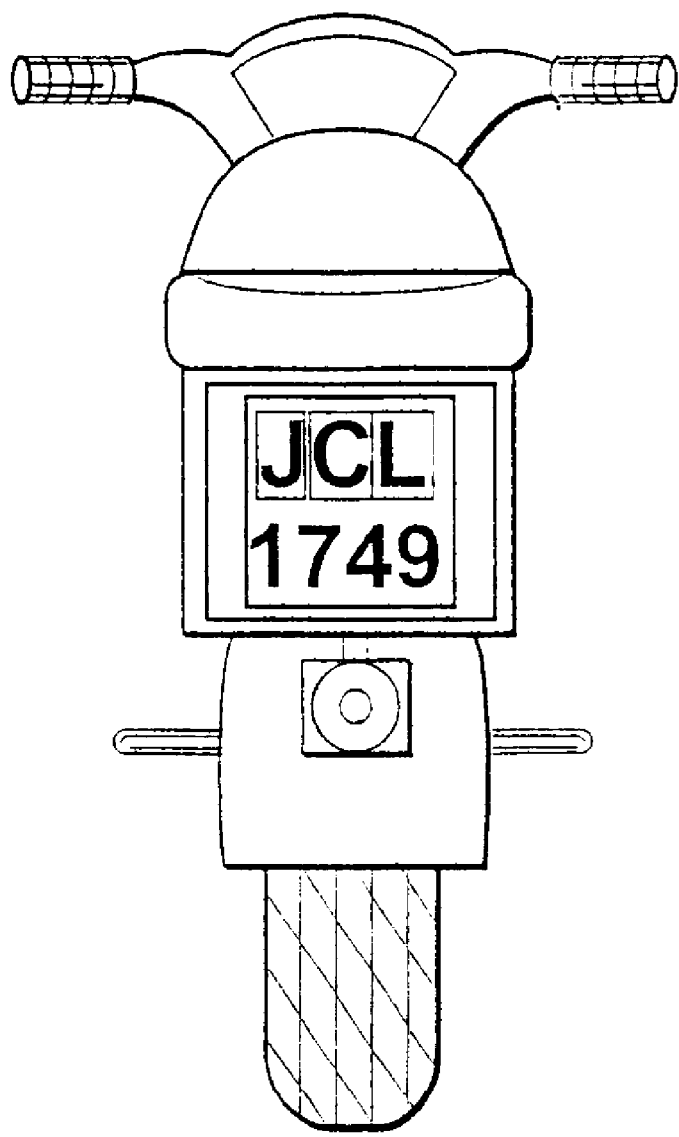
FIG. 15.4

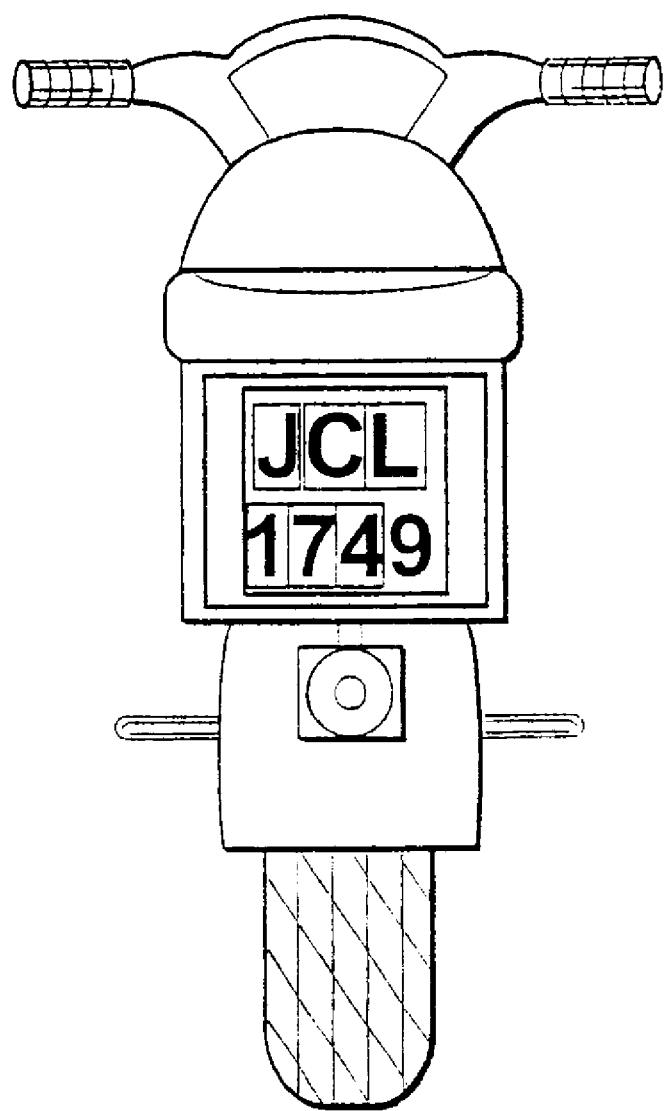
FIG. 15.5

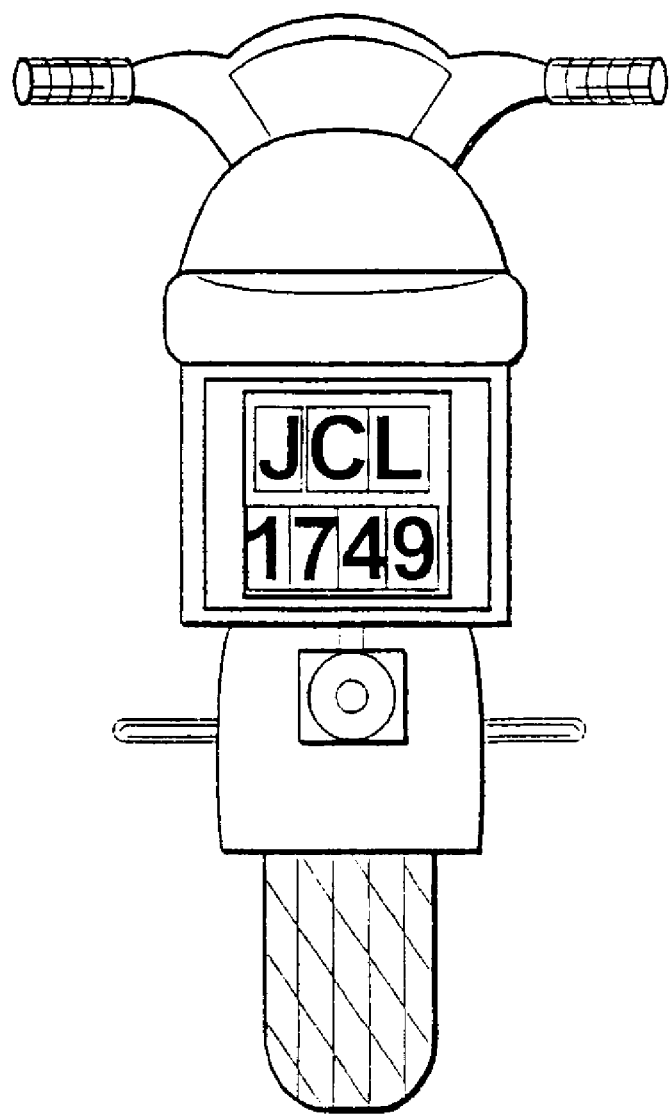
FIG. 15.6

ROBUST IDENTIFICATION CODE RECOGNITION SYSTEM

FIELD OF THE INVENTION

This invention relates to the field of character recognition, and particularly to a highly reliable system and method for recognizing ID-type characters under real-world conditions where factors such as painted character ID distortion, image sensors limitation and induced distortion, and environmentally-caused distortion may make a robust reading difficult.

BACKGROUND OF THE INVENTION

The desirability of having a system to reliably recognize the characters of an alphanumeric identification code (hereinafter "ID") is well appreciated by those skilled in the art. The ID may come in various forms. Some examples are license plate number, codes for freight shipment containers, serial numbers on IC chips, etc. For IDs such as the license plate number, it is more difficult to recognize the ID characters because the characters may be obscured or distorted due to many real-world conditions. For instance, the characters may be partially covered by the frame which holds the plate in place or simply dirt from the roads. Corrosion is another source of distortion. Furthermore, license plates are often located near other forms of writing, bumper sticker for instance, which may be mistaken for the license plate itself.

A number of systems have been developed for recognizing ID characters. For instance, the U.S. Pat. No. 4,817,166 describes an apparatus for reading a license plate. Here, a video camera produces an image of a license plate on a vehicle, and a scanning apparatus finds a license plate number in the image. The identification of the license plate number is verified in a confidence check section by checking for the presence of a state logo. Next, a character extractor identifies individual characters of the number by finding and tracing a contour along interior portions of the character edges, and the contour length, character height, and character width are then checked in a validity checking section to determine whether they are within predetermined acceptable ranges. To correct for obscuring objects on the license plate, a character alignment section determines the top line and baseline of the license plate number and disregards portions of the characters that appear to be outside of these limits, and a license plate frame correction section is utilized to extract the characters when a portion thereof is obscured by a license plate frame. Once extracted, the characters are recognized by a structural analysis section and a state recognition section recognizes the state logo. Once the state is identified, a verification section rereads the license plate number utilizing knowledge of the type style used by the identified state.

Another ID recognition system is described in GB 2,273,191 where an ID code on containers is verified against a target code representing the code of an expected container. An image of the container surface carrying the displayed code is obtained by several cameras and digitized to form a pixel array. The pixel array is scanned to detect potential characters which are grouped together. From the pixel values of the potential characters a set of recognized characters is produced and compared with the target code, the recognized code verified or rejected depending on the results of the comparison between the target code and the recognized code. Recognition is carried out by a neural network.

Although each of these and other similar systems have their advantages, the main shortcoming in the ID recognition systems in general was their inability to achieve sufficient level of accuracy in reading the characters. Part of the difficulty which all of the systems faced was in handling the real-world conditions which may visually distort or obscure the ID characters. Because ID recognition is different than that of character recognition in that every character of an ID must be recognized before a valid ID is identified, even a relatively small percentage of misidentification of the characters can lead to a high percentage of misidentification of the IDs. To illustrate, a 99% character recognition rate is considered to be an excellent rate for character recognition systems; however, for ID recognition, 99% character recognition rate translate to a very poor ID recognition rate. Therefore, there is a need for a truly robust ID character recognition system that can negotiate wide range of real-world situations that may make an accurate reading difficult and which is particularly adapted for accurate identification at the ID level.

OBJECT OF THE INVENTION

It is therefore an object of the present invention to provide a truly robust system and method for identifying characters of alphanumeric identification codes to achieve high accuracy even in situations where the individuals characters may be visually distorted due to real-world conditions.

It is further an object of the present invention to provide a system and method which takes particular measures to achieve high identification success rate at the ID level, and not just at the character level.

SUMMARY OF THE INVENTION

The present invention is a method and system for recognizing the characters on surfaces where alphanumeric identification code ("ID" for short) may be present. The present system is particularly adapted for situations where visual distortions can occur. Although the applications are many, in order to properly and fully describe the present invention, references shall be made to the particular application of recognizing characters on a license plate.

The license plates themselves, due to the environment in which they are exposed to, often become marked, dirty or dented. The presence of corrugations, structural bars, smear and other noise may distort the characters. Thus, the variation in character and background intensity and the lack of adequate contrast pose problems for a reliable method and apparatus for ID code character extraction, recognition and verification. The intensity and contrast of the characters and the background varies with respect to the illumination of the license plate surface in different conditions, such as during daylight, night time and cloud cover. Also, the characters of the ID code may be presented to the recognition apparatus at an angle, thus resulting in characters which are skewed.

The present invention utilizes a highly robust method for recognizing the characters of an ID. Multiple character recovery schemes are applied to account for a variety of conditions to ensure high accuracy in identifying the ID on the license plate. Accuracy is greatly enhanced by taking a comprehensive approach where multiple criteria are taken into consideration before any conclusions are drawn. Special considerations are given to recognizing the ID as a whole and not just the individual characters.

An image of the car in the general area where a license plate might be located is provided as input to the system. Various image enhancement tools are used to provide an image of the most optimal quality.

The potential regions of interest (or ROI for short), i.e., regions which may contain an image of the license plate, are detected using a broad predetermined criterion but no definite conclusions are drawn as to whether the region is actually one containing the license plate. Therefore, several regions may be selected as the possible license plate candidates. Various image enhancement tools of are used to detect the ROIs.

Because the characters may be black on white background or white on black background, the system assumes that both scenarios are possible. Hence, both scenarios are considered. For each of the scenarios, the character candidates are segmented from the detected ROI groups, and then recognized using recognition tools, which include various types of neural network systems. The recognized characters are then grouped to form potential character groups.

The potential character groups meeting certain criteria such as character height, width, etc., are then combined to form a possible ID, called likely ID character groups. At this stage, no definite conclusion as to the accuracy of the ID character groups is made. Still, the ID character groups have been partially recognized, and some information is gleaned during the process. Hence, these groups are now called partially-recognized ID character groups, or PR-IDCG for short. Because several license plate candidates may have been selected, it is possible that there may be more than one PR-IDCG or none at all, depending on the particularities of the image generated from an automobile.

All of the PR-IDCGs that have been extracted go through a series of character recovery schemes to recover any missing characters which may have been due to the fact that the original characters were distorted or obscured by various environmental or other real-world factors. After the recoveries have been made, the ID Candidates are formed, and they are tested for integrity and assigned a weighted value, ranked, and based on this ranking, the ID Candidate with the highest weighted value is selected for further processing.

It is then determined whether the ID selected has a sufficiently high confidence level. If such an ID is found, the system outputs the confidence value along with the ID. But if no ID of high confidence is found, then additional refinement recovery is performed until either a high confidence level is achieved or the system has gone through a pre-selected number of passes without a successful reading which will prompt a reject indicator as the output.

BRIEF DESCRIPTION OF THE DRAWINGS

FIGS. 14.1 to 14.8 are actual real-world images of car license plates.

FIGS. 15.1 to 15.6 illustrate some of the processes undertaken by the present system on actual real-world images of car license plates.

DETAILED DESCRIPTION OF THE INVENTION

The present invention is a method and system for recognizing the characters on surfaces where alphanumeric identification code ("ID" for short) may be present. The present system is particularly adapted for situations where visual distortions can occur. Although the applications are many, in order to properly and fully describe the present invention, references shall be made to the particular application of recognizing characters on a license plate. However, it shall be plainly clear to those skilled in the art that the method and system described herein may be used to identify characters on other surfaces carrying ID-type characters, e.g., containers, IC chips, etc.

The license plates themselves, due to the environment in which they are exposed to, often become marked, dirty or dented. The presence of corrugations, structural bars, smear and other noise may distort the characters. Thus, the variation in character and background intensity and the lack of adequate contrast pose problems for a reliable method and apparatus for ID code character extraction, recognition and verification. The intensity and contrast of the characters and the background varies with respect to the illumination of the license plate surface in different conditions, such as during daylight, night time and cloud cover. Also, the characters of the ID code may be presented to the recognition apparatus at an angle, thus resulting in characters which are skewed.

The present invention utilizes a highly robust method for recognizing the characters of an ID. Multiple character recovery schemes are applied to account for a variety of conditions to ensure high accuracy in identifying the ID on the license plate. Accuracy is greatly enhanced by taking a comprehensive approach where multiple criteria are taken into consideration before any conclusions are drawn. Special considerations are given to recognizing the ID as a whole and not just the individual characters.

Some portions of the present method and apparatus were based on the method and apparatus described in UK Patent No. GB 2,273,191, particularly, but not only, in regard to segmentation and image enhancements. While the present description is complete in itself, to gain a fuller appreciation of the described invention, the cited patent may be read in conjunction with the description provided herein.

Figure 1:
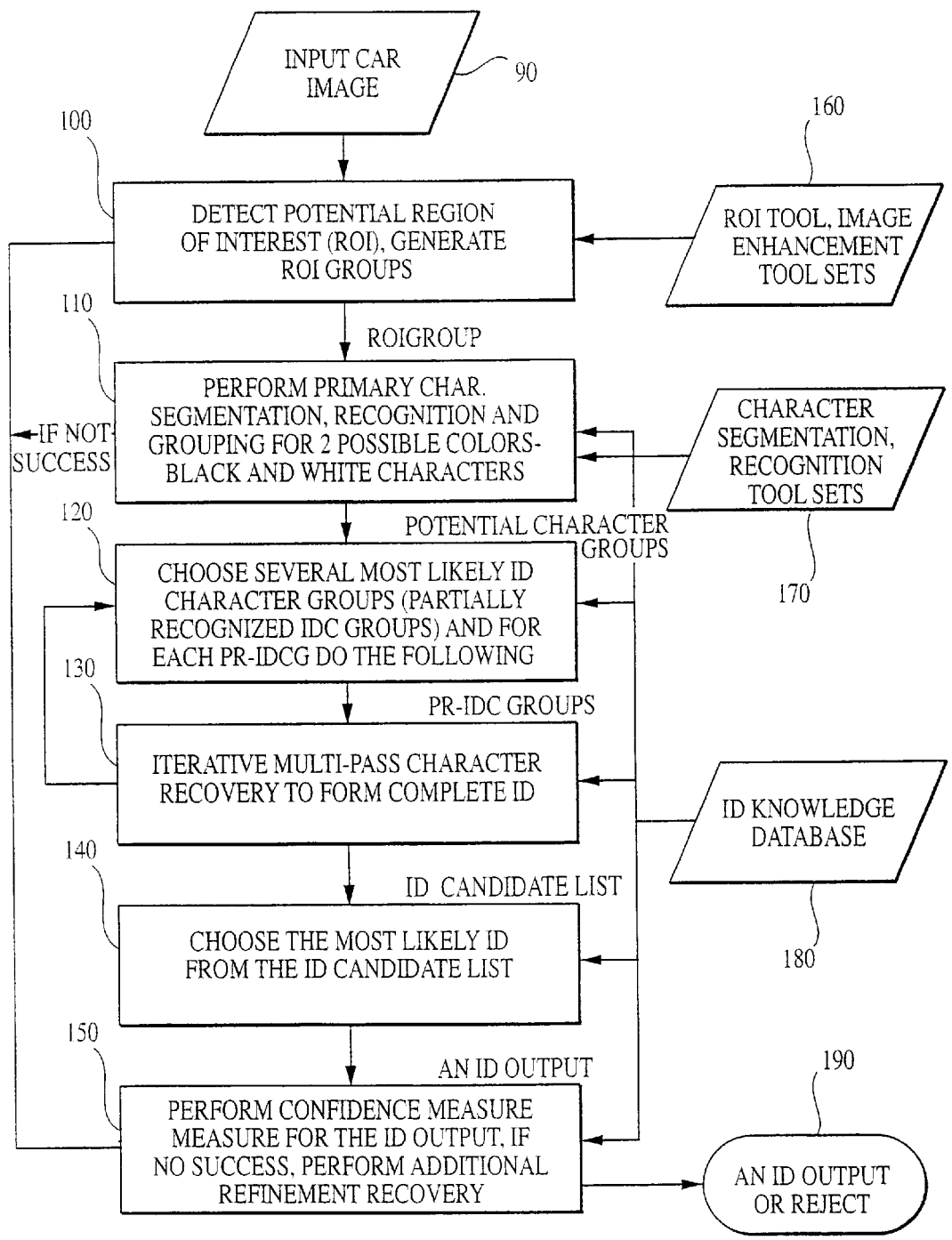
FIG. 1 is a flow diagram illustrating the overall scheme of the present recognition system.

FIG. 1 is a block diagram illustrating the overall block diagram of the method employed in the present invention. More detailed flow diagrams and discussion for each of the blocks shall follow later.

In block 90, an image of the car in the general area where a license plate might be located is provided as input to the system. Various image enhancement tools are used to provide an image of the most optimal quality.

In block 100, the potential regions of interest (or ROI for short), i.e., regions which may contain an image of the license plate, are detected using a broad predetermined criterion but no definite conclusions are drawn as to whether the region is actually one containing the license plate. Therefore, several regions may be selected as the possible license plate candidates. Various image enhancement tools of block 160 are used to detect the ROIs.

Because the characters may be black on white background or white on black background, the system assumes that both scenarios are possible. Hence, block 110, both scenarios are considered. For each of the scenarios, the character candidates are segmented from the detected ROI groups, and then recognized using recognition tools of block 170, which include various types of neural network systems. The recognized characters are then grouped to form potential character groups.

In block 120, the potential character groups meeting certain criteria such as character height, width, etc., are then combined to form a possible ID, called likely ID character groups. At this stage, no definite conclusion as to the accuracy of the ID character groups is made. Still, the ID character groups have been partially recognized, and some information is gleaned during the process. Hence, these groups are now called partially-recognized ID character groups, or PR-IDCG for short. Because several license plate candidates may have been selected, it is possible that there may be more than one PR-IDCG or none at all, depending on the particularities of the image generated from an automobile.

In block 130, all of the PR-IDCGs that have been extracted in block 120 go through a series of character recovery schemes to recover any missing characters which may have been due to the fact that the original characters were distorted or obscured by various environmental or other real-world factors. After the recoveries have been made, the ID Candidates are formed, and they are tested for integrity and assigned a weighted value, ranked, and based on this ranking, the ID Candidate with the highest weighted value is selected for further processing.

It is determined in block 150 whether the ID selected has a sufficiently high confidence level. If such an ID is found, the system outputs the confidence value along with the ID in block 190. But if no ID of high confidence is found, then additional refinement recovery is performed until either a high confidence level is achieved or the system has gone through a pre-selected number of passes without a successful reading which will prompt a reject indicator as the output.

Figure 2:
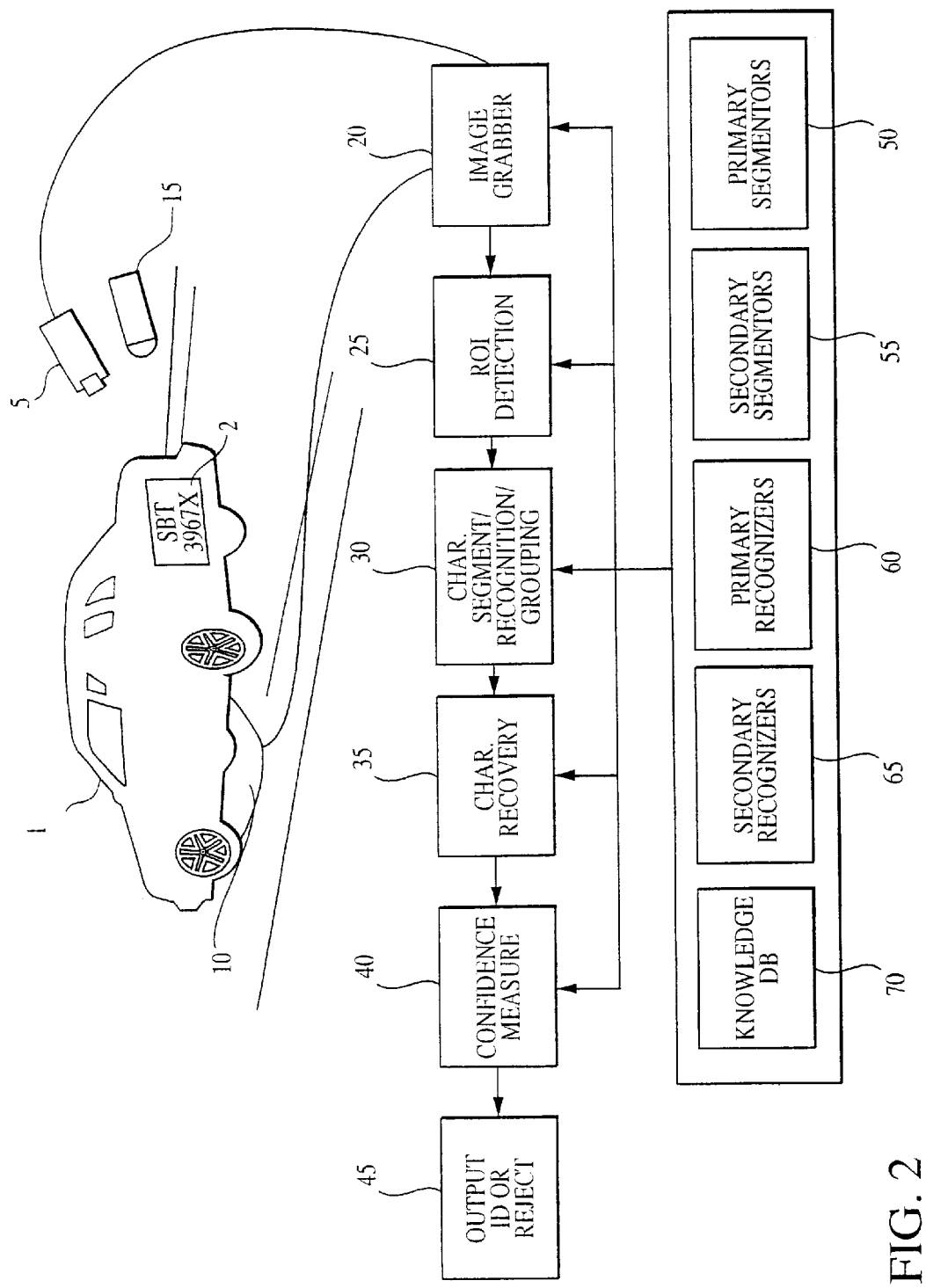
FIG. 2 is a functional diagram illustrating the overall scheme of the present invention.

FIG. 2 illustrates the preferred embodiment of the present system. The apparatus embodying the invention comprises a cameras 5, though multiple cameras may be used to obtain multiple images for the system. When an automobile 1 with a license plate 2 is in view of the camera and initiates the ground loop 10 to trigger the image grabber 20, the camera 5 captures an image of the rear view of the automobile. Each image comprises an array of 720×512 pixels, each pixel being capable of 256 grey levels.

During daytime operation the natural level of illumination of the license plates is normally sufficient and as such no external lighting is necessary. However, in operation during the evening and the night, lights are used to illuminate the automobiles. As shown in FIG. 2, a rear light 15 is located behind the automobile 1 to improve the contrast of the image of the license plate against the background. If the characters which are to be extracted from the surface of the license plate are to be resolvable from the background of the license plate surface, then it has been found that there must be an intensity contrast between the background and the subject of at least 10–15% of the overall image intensity. The closed circuit TV camera 5 has an auto-iris capability to compensate for small variations in illumination.

The image taken from the camera 5 is transmitted to the image processing unit for processing by the image grabber 20. The image processing can be conceptually divided into the following functional units: Region of Interest (ROI) detection unit 25; character segmentation/recognition/grouping unit 30; character recovery unit 35; and confidence measurement unit 40. All of the units utilize certain tools, the most important of which are the primary segmenters (SEG1) 50, secondary segmenters (SEG2) 55, primary recognizers 60, secondary recognizers 65, and the knowledge database 70.

The function and the role of each of the mentioned units and tools are described later when the ID recognition methodology is described in detail. However, some of the tools warrant further elaboration as given below.

The ROI detection unit 25 may comprise several modules, each module employing different techniques for detecting the ROI region. The system can be optimized by utilizing the module which is best suited for the particular situation.

The primary character recognizers 60 comprises three separate recognizers which are neural network based: one for both alphabet and digit characters, one for alphabet characters only, one for digit characters only, which are named as NN1-AD, NN1-A, NN1-D, respectively. These are window-based neural network recognizers which are primarily used to recognize characters with gray level which are properly segmented.

For recognizing characters which are more difficult, i.e, the boundaries are not well defined, the secondary recognizer 65 is used. The primary character recognizer 60 also comprises three separate recognizer which are neural network based: one for both alphabet and digit characters, one for alphabet characters only, one for digit characters only. Unlike the primary character recognizer, the secondary recognizer 65 is based on an integrated character segmentation/recognition neural network (ICSRNN) which scans along a potential character string and outputs a profile. This recognizer 65 is used primarily during the recovery stage of the ID recognition process when, unlike properly segmented characters, the character width is not certain and are based on the sizes of nearby characters. For this ICSRNN, character segmentation and recognition become one process; there is no distinguishable separate steps for character segmentation and recognition.

The secondary recognizer 65 also includes a Fourier-feature-based character recognizers, called as FDNN, which use binary pixel maps of characters where a higher image resolution is used to achieve better resolution. This capability is particularly useful when distinguishing two characters which are very similar such as when distinguishing between a "B" and an "8". Higher resolution will help to distinguish the differences in the left sides, the distinguishing side, of these two characters. By employing different character segmenters and recognizers which are functionally complementary to each other, much more robust segmentation and recognition can be achieved.

The process of segmentation also utilizes two types of segmentation tools, SEG1 50 and SEG2 55. SEG1 50 is the primary character segmenter in the system, and it is very robust towards gray level variation. However, it is very sensitive to slanting of characters. The secondary segmenter, SEG2 55, is based on binary level images and connected components algorithm, and it is not sensitive to character slanting.

To achieve a truly robust ID reading it is important to build a good ID knowledge database, 70, which is used in all of the units 25, 30, 35, and 40. Basically, the ID knowledge database has two main components: static knowledge and dynamic knowledge.

The static knowledge includes alphabet prefix list which is a list of the possible prefix characters of all license plate numbers; a check formula; and ID layout formats such as numbers of rows, how alphabet and digit portions are arranged spatially, symmetry of the arrangement, etc. This set of static knowledge is more or less fixed, and will not be updated often.

Another set of knowledge is the dynamic knowledge, which is related to algorithms in use. This set of knowledge data can be collected only when a large set of typical images are collected, and then a set of algorithms are applied to the image set. Then, it can be determined which segmentation algorithm is more effective against what type images.

Based on the testing runs, the following knowledge data is obtained, which is important in optimizing the overall design of the system to achieve robustness. It includes:

Percentage of characters which can be handled using SEG1 and the rest being handled by SEG2.

Percentage of images where ROI can be detected using a particular ROI module

Width and height, variations of inter-spacing between characters of a sample collection of license plates under a defined camera set-up and lighting condition.

A large number of images are used to generate sample images for these runs. Aside from providing data for the knowledge database, the test runs also provide means for training the neural networks.

To achieve robust ID reading it is very important to collect a set of image database which include all the typical image samples under operational conditions. The image database will be used in the whole process of the system development phases.

License plate numbers follow a particular standard depending on the relevant jurisdiction. For instance, in some countries, all license plate numbers must have a two alpha prefix followed by a 4-digit number suffix. However, a different standard may be applied in another region. Knowing the standard is extremely helpful in recognizing the license plate number. Hence, the present invention incorporates into its system information regarding this standard. For the purposes of the following description, it is assumed that the standard for the license plate numbers in the relevant jurisdiction is one that has a one to three character long prefix, a one to four digit long numerical suffix, and a single alpha check character, which may or may not be present.

Having gone through the general scheme of the present ID recognition system, now the detection method shall be described in detail. Referring to block 90 of FIGS. 1 and 2, to generate the image of the portion of the car containing the license plate, the camera 5 is chosen to focus on the rear of the automobile when the image trigger 10 is actuated. The ground loop 10 triggers the image grabber 20 which applies an algorithm to adjust the contrast setting of the frame grabber 11 so that the mean grey level for a predetermined image window defined by the camera's field of view is at an optimal value. The algorithm uses Newton's method to compute the new value of the contrast setting according to equation (i):

$$\text{new contrast} = \text{old contrast} + \text{slope}(\text{mean} - \text{optimum mean}) \text{ slope} = \Delta\text{contrast}/\Delta\text{mean at last iteration} \qquad \text{i)}$$

The delta operator ($\Delta$) indicates the change in contrast or mean grey level respectively between the last iteration and the current one. The optimal mean value and the slope have been experimentally determined.

Having determined the contrast setting an image is captured in image grabber 20. The image consists of an array of 720×512 pixels, each pixel being capable of a quantisation level of between 0 and 255.

The input image of a car with a license plate is first analyzed in Block 100 of FIG. 1 to determine potential areas where the plate is located. These areas form Region Of Interest Groups (ROIGroups). FIG. 15.1 illustrates an image of a front portion of a car and the ROI, defined as the area inside the rectangular box, which was detected by the ROI detection unit.

In the ROI detection process, there are a number of ROI detection and image enhancement tools, block 160, which can be used at different iterations of ID reading process. These tools are designed to handle different types of images such as normal images, low contrast images, and the images where ID characters are merged with other structures.

There are currently many commercially available algorithms which can be used to detect the ROI where a license plate can be located. By isolating the ROI areas, the system saves much computation time because ROI areas are only a fraction of the entire image accounting for, in general, only about 10–15% of the whole image, or in certain instances, less. Based on the regularity of character stroke's width and inter-character spacing, simple one dimensional highpass filter can be used to detect approximate vertical positions of license plate in a given image. Also there are other algorithms based on more advanced features such as directional feature of characters to locate the ROI areas. The preferred strategy is to use a set of ROI detection modules instead of one algorithm in order to achieve a robust detection.

Referring to FIG. 1, after the ROI detection process, preliminary segmentation and recognition are carried out on the ROIGroups. In Block 110 there are two pipelines which handle two types of characters—black characters on white background and white characters on black background. Each pipeline performs character segmentation, recognition, and character grouping, the last of which is based on character spatial dimension (W, H), and location. These character groups are named as Potential Character Groups (PCGroup) because some segmented characters may not be genuine characters at all but symbols or random patterns resembling a character. Alternatively, they may be legitimate characters, but not those that belong to the license plate.

If there are not enough PCGroup at this stage, the system indicates that due to various problems with the ID characters such as merged characters, or failure in the ROI detection process, the system has gone back to block 100 for possible image enhancement, alternative ROI detection (by invoking appropriate tools in Block 160 of FIG. 1), or a whole image based character segmentation.

As illustrated in FIG. 15.2, the character segmentation process locates and extracts a bounding box for each ID character of the ID from the image. Here, the characters "J", "D", "T", "9", "4", "8", and "5"have all been properly segmented. The extracted bounding box is normalized to a standard size and a character pixel map of this information is passed to the primary network character recognizer which identifies the character classes.

Figure 3:
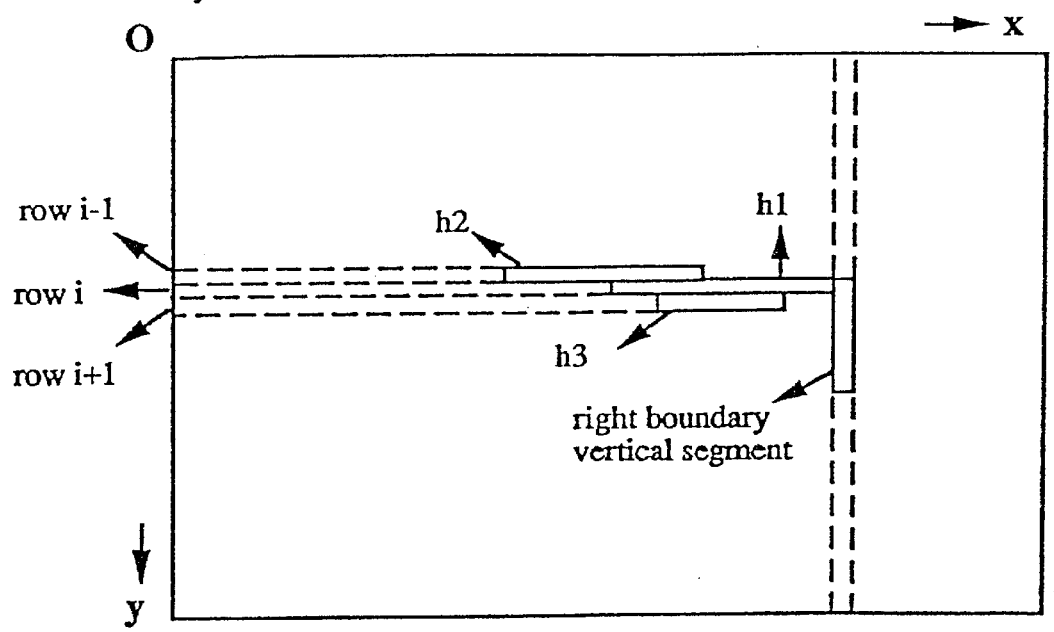
FIG. 3 is a diagram illustrating a segmentation method.
Figure 4:
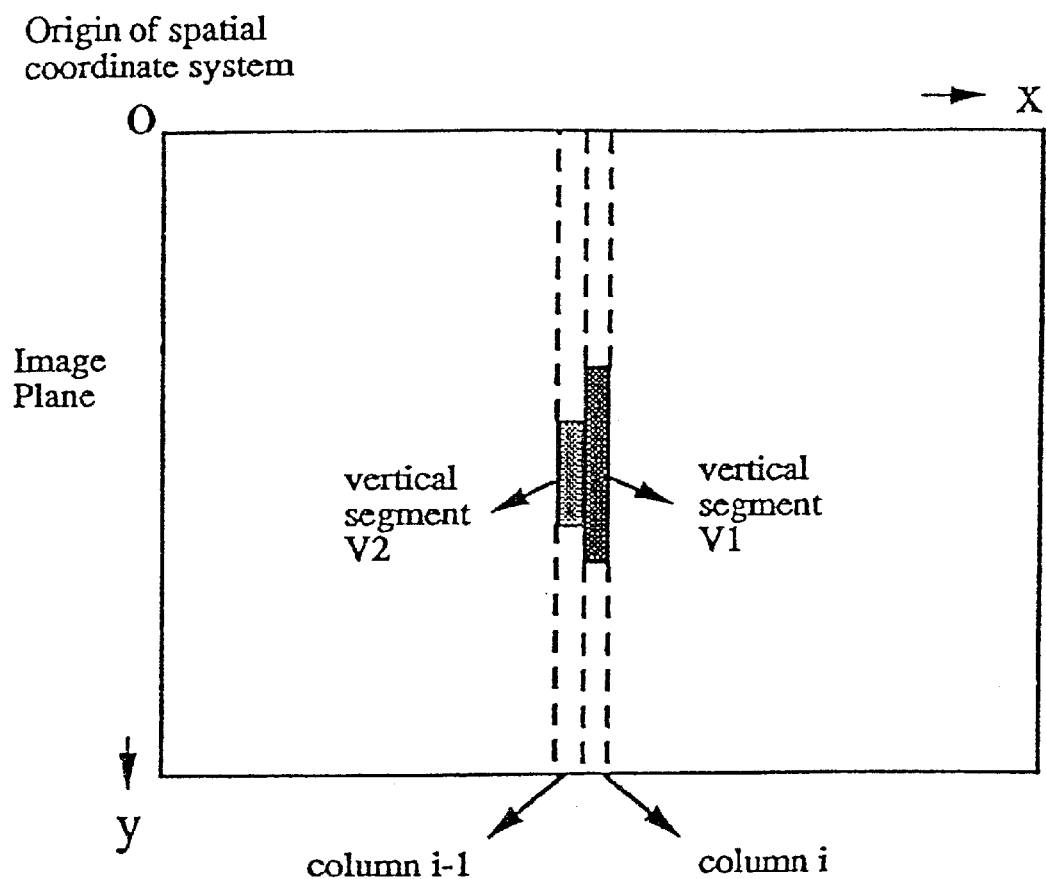
FIG. 4 is a diagram illustrating a segmentation method.

To determine the location of all potential characters within the image and to establish a surrounding rectangle or bounding box around each potential character, the captured image is analyzed in block 25 and 30, see FIG. 2. In the primary segmenter, SEG1, the grey level of each pixel in each column is quantised and horizontal and vertical segments are created based on the quantised value. A horizontal segment, see FIG. 3, is defined as a part of a row of the image in a column for which the adjacent pixels in the horizontal direction have the same quantised value. Similarly, a vertical segment, see FIG. 4, is a part of a column for which adjacent pixels in the vertical direction have the same quantised value. Therefore, the image has now been divided into vertical and horizontal segments consisting of a number of pixels which are associated by their respective quantised values and the image can now be scanned segment by segment thus saving both time and memory space.

The vertical segments are scanned and all segments which are on the right hand boundary of a character are detected. These are defined as right boundary vertical segments, see FIG. 4, and each of these segments must satisfy two conditions: there must a corresponding vertical segment (V2) to the left of the vertical segment (V1) of which at least a part must be adjacent to the first segment (V1) and the quantised value of the corresponding vertical segment (V2) must be different from that of the right boundary vertical segment (V1).

The threshold or extent of each potential character is based on the pixel grey level at the boundary defined by the boundary segments. If the background colour of the image is white, then the threshold is selected as the lowest grey level. If the background colour of the image is black, then the threshold is selected as the highest grey level. The threshold is used to determine if the potential character is connected to any other components which may belong to the same character. An example of connected horizontal segments is shown in FIG. 3 which shows three connected horizontal components h1 to h3. By limiting the character size to a predetermined level, the number of connected components will be reduced. Each character is surrounded by a bounding box which defines the spatial extent of a character.

This process creates a character pixel map comprising horizontal and vertical segments. Features based on the aspect ratio and the histogram of the character pixel map are computed. If the value of the feature defined by the character pixel map is not in an acceptable range which has been defined by heuristic rules, then the feature is eliminated as noise.

To perform robust character segmentation and recognition, a set of character segmentation and recognition tools have been developed and used in block 170 of FIG. 1. For character segmentation, a region growing gray level based segmenter, SEG1, is used as primary character. SEG1 works fairly robustly for images with a large range of contrast variation. Experiments showed that it can segment higher than 95% of ID characters. However, to achieve robust ID reading, this performance is far from satisfactory. For a ten-character long ID, this rate will provide an all-10-character-segmentation-success rate of 0.9510= 0.599, assuming a character recognition rate of 99%, which leads to 10-character-recognition-success rate of about 0.9910=0.904. Therefore, the ID reading success rate is about 0.599*0.904=0.54, a rate which is too low for many applications.

To achieve a better character segmentation rate, we have developed additional character segmenters with complementary features compared to the primary segmenter. One of the drawbacks of the primary character segmenter, SEG1, is that it is very sensitive to slanting of characters. One of the alternative character segmenters, SEG2, is based on binary level images and connected components algorithm, and it is not sensitive to character slanting.

The normalized grey-scale character pixel map after segmentation is presented as the input to the primary recognizer in block 110. The quantised grey level of each pixel is normalized to a value between 0 and 1. The grey level value is not binarised to either 0 or 1 as the choice of the binarisation threshold would influence the shape of the character defined by the pixel map. This may result in portions of a character being artificially connected or broken.

Figure 18:
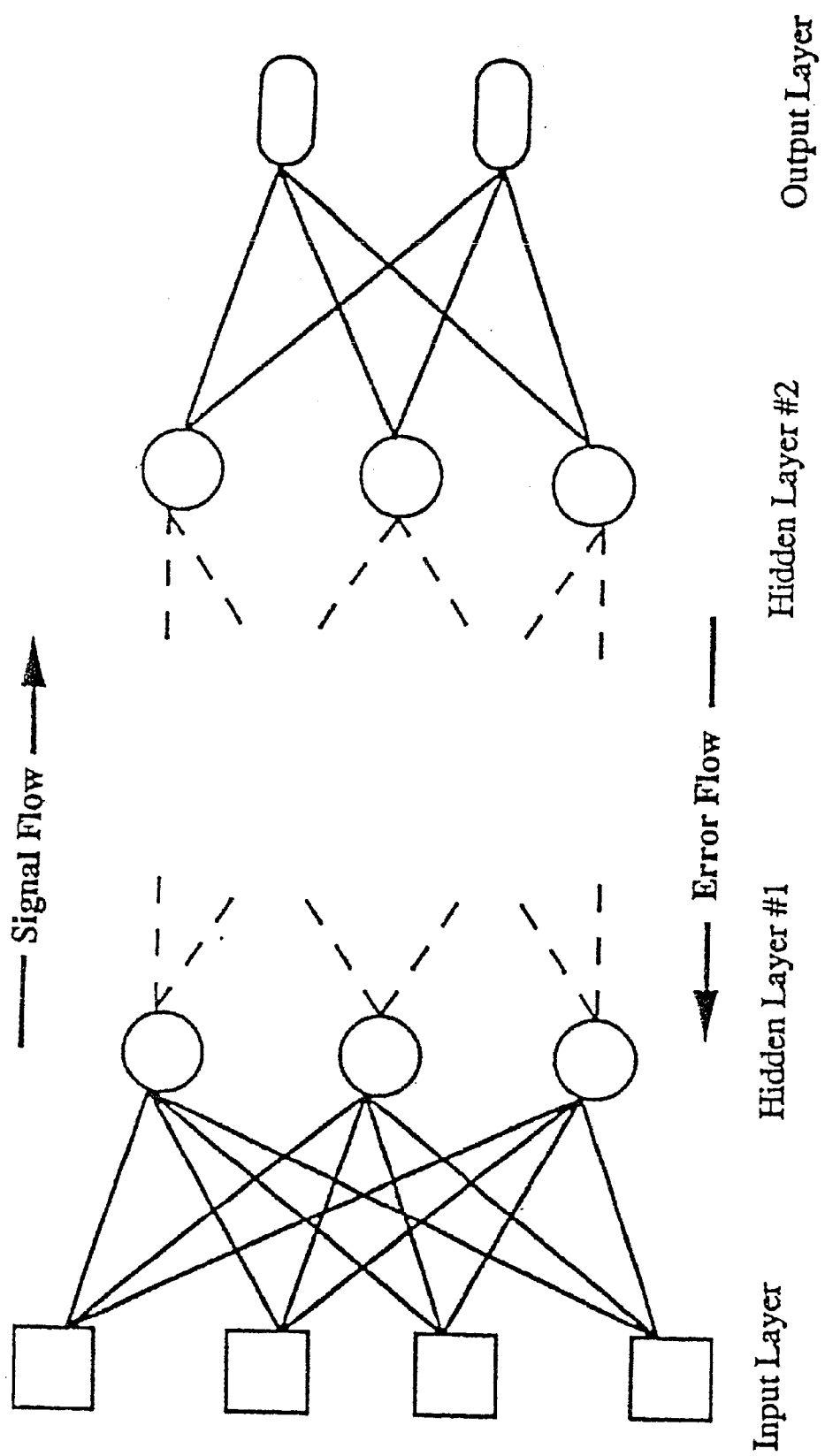
FIG. 18 is a schematic representation of a multi-layer neural network structure.

The neural network is used to recognize the patterns defined by the standard size characters. This method is utilized because it offers good tolerance to noise and deformations in the input characters. Specifically a multi-layer feed-forward window-based neural network model is used. The general architecture of the neural network is shown in FIG. 18.

The neural network consists of an input layer, one or more hidden intermediate layers and an output layer. Defined areas or windows of the normalized grey level character pixel map are used as the input for the neural network. In one embodiment, shown in FIG. 16, two windows are used which are defined by the upper left and lower right co-ordinates of two rectangles or equivalent size. Together, the two rectangles bound the entire character pixel map. The windows are fed to the input layer of the neural network and each pixel within the boundaries of each window constitutes an input node of the input layer.

Each node of the network computes the following function:

$$y_i = f\left(\sum_{j=1}^{N} w_{i,j} - \theta_i\right) \qquad \text{ii)}$$

where $y_i$ = output activation value of node $i$ $x_j = j^{th}$ signal input to node $i$ $w_{i,j}$ = connection weight from node $j$ to node $i$ $\theta_i$ = bias In the above equation, f(x) is a monotonic increasing, differentiable function, the output of which is bounded between 0 and 1.

Figure 17:
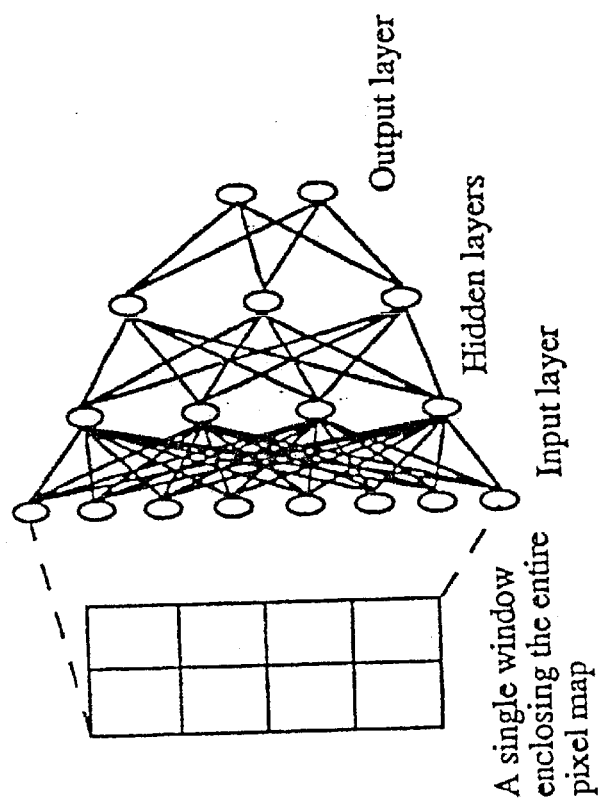
FIG. 17 illustrates a conventional neural network architecture.
Figure 16:
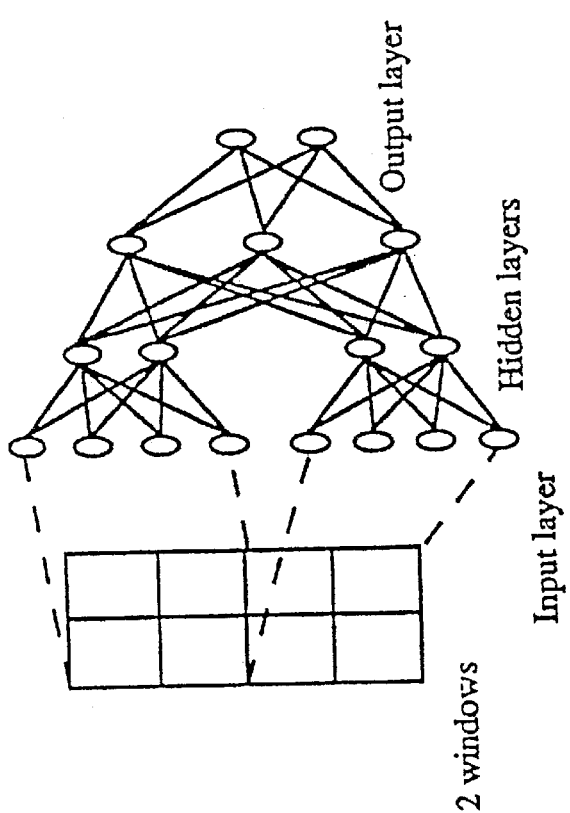
FIG. 16 illustrates a window-based neural network architecture.

The input nodes of the input layer are connected to specified ones of the first hidden intermediate nodes of the first hidden intermediate layer. Thus, input nodes of the first window are connected to a first set of specified intermediate nodes and input nodes of the second window are connected to a second set of specified nodes. In this manner the input nodes associated with one window are fully connected to specified hidden intermediate nodes in the first layer but not to hidden intermediate nodes in the first layer associated with other windows. The two sets of this network architecture is shown in FIG. 16 together with a conventional network as shown in FIG. 17. For subsequent layers after the input layer and the first intermediate layer, the nodes of consecutive layers are fully connected.

In a particular embodiment of the invention only the following characters need to be recognized: A to Z and 0 to 9, i.e. a total of 36 characters, 26 letters and 10 numerals. Therefore, the output layer would consist of 36 nodes each representing a particular character.

Using a window-based neural network of this type allows windows to be strategically located in the character pixel map to discriminate between confusing characters and improve the accuracy with which the characters are classified. Also, compared to the conventional fully connected network shown in FIG. 17, less synaptic connections are required between the input and first intermediate layers thus reducing processing time and memory requirements. Experimental results have shown that the time required to train such a system can be substantially reduced yet the recognition performance is improved slightly.

The network is trained using the popular sigmoidal function:

$$f(x) = \frac{1}{1 + e^{-x/T}} \qquad \text{iii)}$$

and the network is operated using an approximation to the training function:

$$f(x) = \frac{T + x + |x|}{2(T + |x|)} \qquad \text{iv)}$$

In both cases, T is a parameter used to control the non-linearity. Both functions behave similarly in that they are both bounded between 0 and 1, are monotonically increasing and differentiable. Moreover, when T approaches 0, both become step functions. When T approaches ∞, both approximate to a horizontal line passing through f(x)=0.5. Because the second function requires more iterations to attain a similar level of recognition performance compared to the first function, the first function is used for training purposes. However, after training, the second function replaces the first function without any degradation of recognition performance.

In a preferred embodiment, the neural network does not attempt to distinguish between "O" and "0" or "I" and "1" because some license plates use identical character fonts for both characters. However, the matching procedure which is to be discussed below can resolve any ambiguity that arises due to this confusion.

After processing in block 110 and if enough PCGroups have been found, then, based on ID knowledge database, these PCGroups are further analyzed in block 120 to determine if they are genuine license plate characters according to character height and width, and other layout information of valid license plate characters. Only those PCGroups which can pass this examination will be considered for further reading process, and they can considered as Partially Recognized ID Character Groups (PR-IDCGroup). Therefore in the above process some of the PCGroups were eliminated.

At this stage, groups of potential characters have been identified from the image. However, these extracted characters may be skewed, of different sizes and on different backgrounds. Therefore, a normalization step is carried out which firstly converts the pixel maps of each character to white character on a black background and secondly standardizes the size of each character pixel map using scale factors computed in both x and y directions. Usually, this results in a linear compression since the size of the extracted characters is larger than the standard size.

At this stage each PR-IDCGroups have their own color, black or white. Then the system tries to determine a likely color (black/white) of the characters of the license plate based on the regularities of these PR-IDCGroups. In this way some of the PR-IDCGroup can be eliminated for further processing. However, if the color of the ID characters can not be decided then PR-IDCGroup with both colors will be passed to the next module for subsequent reading refinement.

Moreover, it should be pointed out that it is very rare that all characters of a license plate can be fully segmented and recognized correctly at once from the two pipeline processing. For example, FIG. 15.3 illustrates an image of a motor bike with a license plate. Here, a ROI is detected but only the top row of the ID is fully enclosed within the ROI box. So only the characters in the top row are segmented. Moreover, the image of the character "L" from the top row was merged with a screw nut located close to the top of the character (shown in the Figure as a blurry white spot). The system, hence, interpreted the character to having an abnormal height, and the segmented pattern was eliminated.

Therefore, main function of the pipelines in the first pass is to obtain likely character groups to form initial PR-IDCG, then various levels of recovery process can be performed to recover missing characters iteratively, the system can eventually produce a complete ID. It shall be discussed later how the system's recovery scheme successful recovered the letter "L" from this example.

Using just the steps described above, at least some (but hopefully most) of the license plate numbers can be identified. It has been found that the system using just the steps above can identify about 90% of all characters it reads. However, although this percentage is high at the character level, i.e., recognizing individual characters, it was found to be much lower at the ID level, i.e., recognizing the ID as a whole. In other words, 90% success rate in recognizing is far from 90% success rate in recognizing IDs. Because even a single mis-identified character in an ID will lead to mis-identification of the entire ID, in cases where there are many characters in an ID, the success rate for ID is much lower than that of the combined character segmentation and recognition success rate. Empirically, it was found that more than 10% of all IDs could be mis-identified for this reason even where the rate of mis-reads at the character level was only at around 10% (for 10-character long IDs).

While for some applications, the more important figure is the success rate at the character level, in situations such as recognizing license plate numbers, it is the accuracy in recognizing the entire ID as a whole, i.e., the entire license plate number, which is the more important criteria. To substantially improve the success rate at the ID level, the present invention utilizes an iterative multi-pass character (IMPC) recovery process using the information gained from the initial character recognition reading. The rest of the discussion shall describe in detail this recovery process.

During the IMPC recovery process, there are two types of recovery operations: sub-ID level recovery and ID level recovery. In the sub-ID level recovery, recovery operation is performed on a partial ID, and it can be a partial ID in single row. For example, if a license plate number JCL1749, as shown in FIG. 15.3, has a two-row format, i.e., JCL in the top row and 1749 in the lower row, the system considers both JCL and 1749 as sub-IDs, since they are located in two rows and they can be handled independently in the recovery process.

On the other hand, in the ID-level recovery, the system performs recovery based on studying various constrains at the ID level. For example, the recovery is performed based on ID's logical composition and spatial layout rules, and symmetry constraints and check formula. Both of these recovery operations, however, depend on the ID knowledge database which includes ID logical composition, spatial layout rules, alpha prefix list, check formula, etc.

The above recovery process is sequentially performed for each PR-IDCG and ID Candidates will be generated for further analysis. After the recovery process, a list of ID Candidates is evaluated, and each ID is assigned an index which indicates how likely the given ID is complete. This index is based on whether a complete valid alpha prefix, a digit suffix are present, whether the ID fields' spatial layout conform to the ID layout rules, and whether the given ID conforms to the given check formula.

If none of the ID Candidates are valid, depending on the level of the completeness of the ID Candidates, several procedures can be taken to either improve this ID Candidate list, or start an ID reading process all over again. One possibility is to go back to block 100 of FIG. 1 for image enhancement or to ROI detection based on an alternative ROI routines. In the alternative, the ROI procedure can be skipped, and a whole image based character segmentation using the alternative segmenter, SEG2, can be invoked to do further reading refinement.

If segmentation must be done over during the character recovery process, the alternative segmenter, SEG2, is used instead of the primary segmenter, SEG2. The two segmenters have different characteristics and respond better to certain situations. When it is discovered that the initial segmentation was not wholly successful, a slightly different approach is taken in the subsequent segmentation. By employing a set of complementary tools for character segmentation, as with image enhancement and character recognition, a robust ID reading can be achieved.

When the recovery process is completed and a most-likely ID Candidate is selected from the ID Candidate list (called ID output) further examination is performed to ensure the recognition accuracy. There are many criteria in performing the examination, such as activation values of recognition results of neural network recognizers, spatial layout regularities, etc. The main goal of these confidence measures is to reduce Ppass-wrong rate while maintaining a low Preject-wrong rate. A detailed list of the performance measures is shown below under section entitled System Performance Measure.

If the ID output can pass all of the above confidence measures, it will be outputted by the system as a reading result; otherwise, based on the examination of the ID, the ID may undergo more refinement such as recognition result refinement, or character bounding box reediting to see if the revised results can pass the confidence measure.

If still not successful, the system will output a rejection signal which indicates that the reading system has no confidence to output a reading result and human help would then be needed. In principle, to ensure good recognition results, a small percent of reject is necessary. However, how low the rejection rate should be set at depends on the requirements of the particular application at hand and the image quality level.

As can be seen from FIG. 1, the inputs to the IMPC recovery unit are the Partially Recognized ID Character Groups (PR-IDCGs) which are the output results from block 120. As the system does not have any prior-information as to which PR-IDCG actually contains the ID characters to be read, it has to loop through each one of them, and compute a weighted ranking based on syntactic and layout format information. During the IMPC recovery process, the system tenaciously attempts to map each PR-IDCG as much as possible to the ID to be read. The entire mapped PR-IDCG structure is named ID-Candidate List (IDCL), and each ID-Candidate represents a possible license plate ID.

As pointed earlier, there are two recovery levels: sub-ID level and ID-level. At the sub-ID level, the sub-id can be a row segment of the whole ID, and there are three recovery routines at this level: gap/spacing based recovery, prefix-based recovery, digit-suffix-based recovery. At the ID-level, there are two recovery routines: layout-based recovery and check formula based recovery. In general, sub-ID level recovery routines are performed first so that complete sub-ID can be formed, then in turn ID-level recovery can be invoked based on ID-level knowledge. All these five recovery routines will be called as IDC Recovery.

As each of the 5 recovery routines are invoked upon the basic PR-IDCGs, successful recovery of missing characters necessitates update to the ID Candidate List. A new ID Candidate may now meet the firing criteria of some recovery which are previously not satisfied. In other words, successful invocation of a recovery routine may spawn new recovery routines. An additional outer loop therefore controls and limits the overall IMPC R inspection process. A maximum of 3 trials is permitted.

Figure 5:
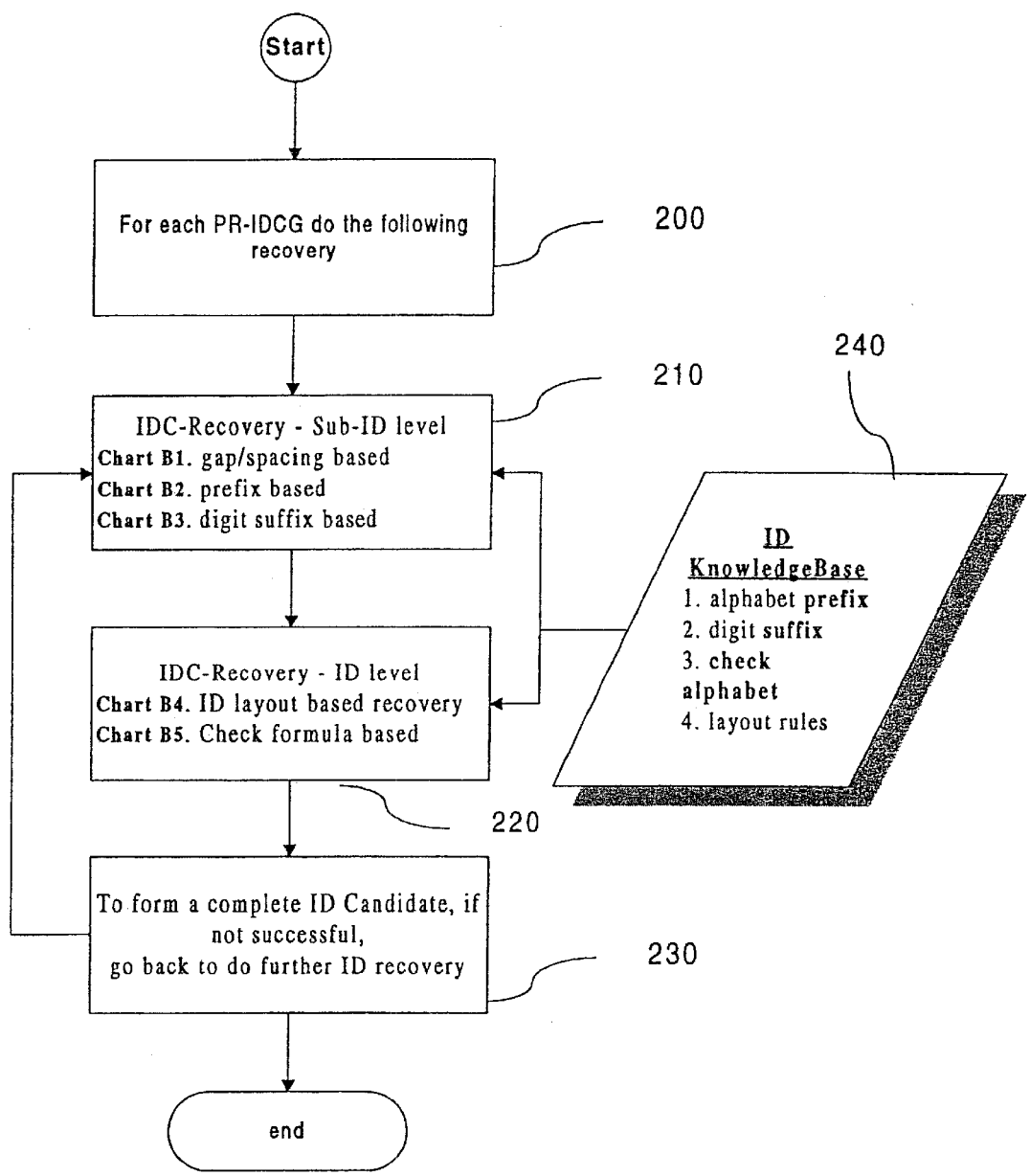
FIG. 5 is a flow diagram illustrating the Iterative Multi-Pass Character (IMPC) Recovery routine.

Now in looking at the IMPC recovery in a more detailed diagrammatical form, FIG. 5 is a flow diagram illustrating the general overview of the IMPC scheme performed in block 130 of FIG. 1. A more detailed flow diagram illustrating the specific steps for each of the blocks in FIG. 5 shall be presented later in the discussion. In referring to FIG. 5, the partially recognized ID character groups (PR-IDCGs) are provided for in block 200. These PR-IDCGs are then go through a sub-ID character recovery process in block 210 and ID-level recovery in block 220 where PR-IDCGs are tested for integrity and characters which were mis-segmented, mis-read or not recognized are recovered. An ID knowledge data base 240 provides the necessary data for executing certain recovery routines. The data base 240 basically contains certain knowledge about the ID that can be used to test the integrity of the reading. For instance, the data base has all of the possible alphabet prefix for all of the IDs, and the rules by which the ID should be laid out.

In this case, because of the particular conventions followed by the relevant jurisdiction, it is assumed by the system that the license plate number contains a 3-character alphabetical prefix, a 4-digit number, and a single-character alphabetical suffix (if one exists). The layout rule dictates that the prefix is followed by the number followed by the suffix, again a rule which is determined by the convention of the relevant jurisdiction. The prefix may or may not be in the same row as the rest of the characters, but the suffix and the 4-digit number must be in the same row. Also, all of the characters making up the respective portions of the ID, the prefix, digit, and suffix, must be in the same row. The ID knowledge data base would contain all valid prefix and suffix formats, and the layout rules. In ensuring high level of accuracy and reduction in steps, it is beneficial to include as much knowledge about the format of the particular ID to be recognized. Of course, the knowledge database can be used to store different ID formats for different applications such as serial numbers for integrated chips, container codes, or license plate numbers for different jurisdictions.

After the characters have been recovered using the four recovery schemes in blocks 210 and 220, the character groups are combined to form ID Candidates in block 230. There may be several ID Candidates or none at all depending on the how successful the character recovery routines were. Further ID recovery may be performed if no ID Candidate is found.

The gap/spacing based IDC Recovery is a straight forward application of the domain rule that almost all license IDs are closely placed. Whereupon cases where the system finds a wider-than-average gap between two successive characters in an ID Candidate, recovery methods can be used to recover the missing characters. The methods are resegmentation based and ICSRNN based recovery. In the ICSRNN based method, the system initializes the white space pixel-map and invokes ICSRNN for inter-character gap recovery of potentially missing characters, i.e. characters which were not segmented and recognized properly in the initial run. In the resegmentation based method, the secondary segmenter, which is complementary to the primary segmenter, can be invoked to perform re-segmentation. The main advantage of the re-segmentation method is that in general resegmentation method provides a better location accuracy than scanning based method using the ICSRNN. On the other hand, sometimes, where the characters are merged together or broken, the only way to recovery these characters is to use scanning based method.

Figure 6:
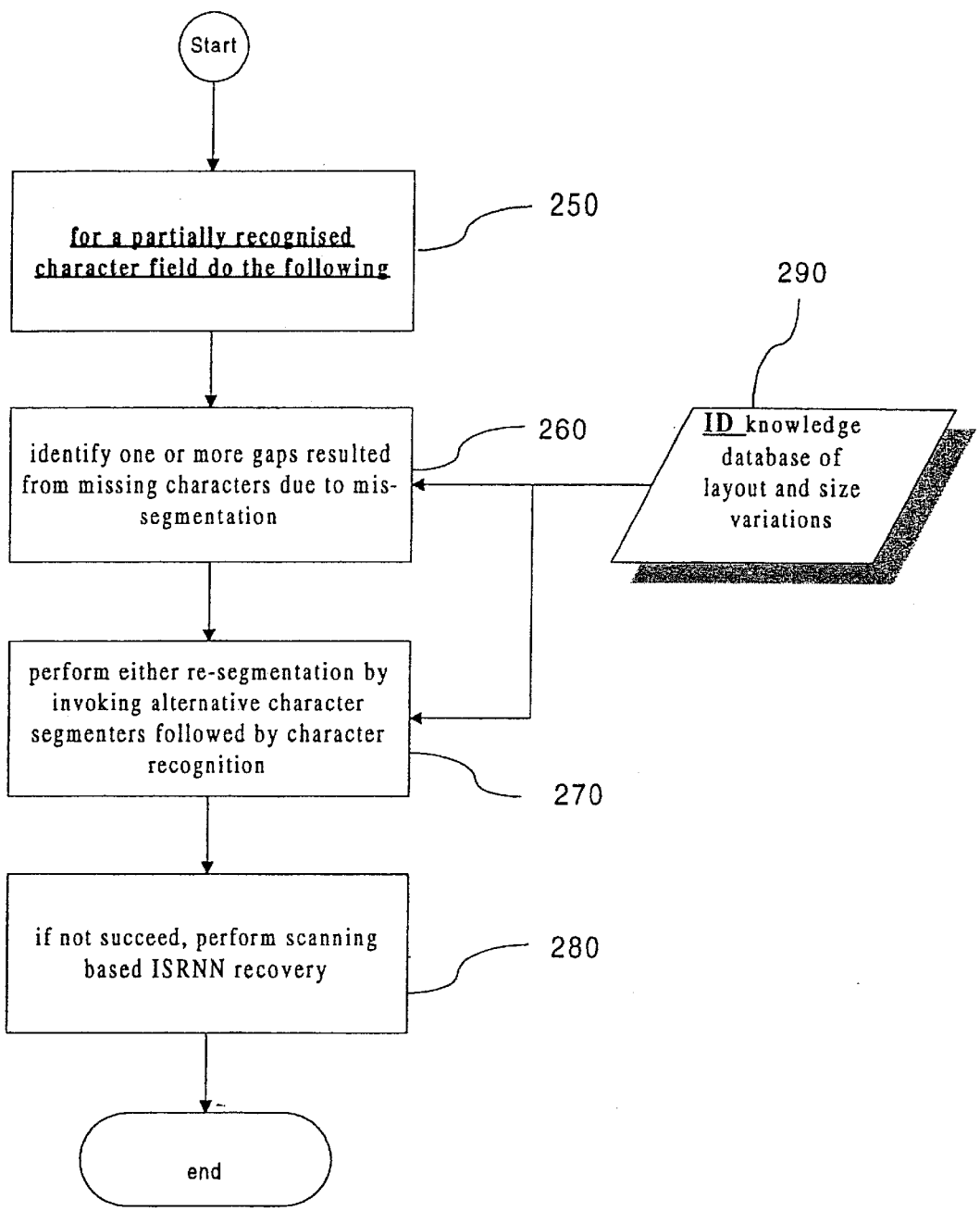
FIG. 6 is a flow diagram illustrating the sub-ID level gap/spacing based character recovery routine.

FIG. 6 illustrates in detail the steps for the gap/spacing based recovery of block 210 from FIG. 5. Logically, it is better to do the gap/spacing-based recovery before the other recovery routines because the information about the spacing between the characters is useful for other recovery routines.

First, the PR-IDCGs are provided for in block 250. In block 260, one or more gaps resulting from a unrecognized character are identified. In identifying the gaps, a number of criteria are considered using, among others, information available through the ID knowledge database. Using the properly segmented characters as the starting point, the mean distance between the characters and the mean width of the characters are measured and computed. To ensure that gap being measured is truly a gap between ID characters, the knowledge about the layout and size variations of a legitimate ID taken from the ID knowledge data base 290 is used to exclude characters from consideration that do not conform to the standard.

To determine whether the width of the gap is a result of a missing character as opposed to gap which exists naturally, a formula is used as a general guideline. The formula is 2*distance>3*ics, that is, twice the measured distance between the characters, the gap, should be greater than three times the mean inter-character spacing computed.

If a true gap is detected, then the system begins to prepare for character recovery. Two methods are available. The first, shown in block 270, is to resegment the missing character using the secondary segmenter followed by character recognition. If this proves unsuccessful, then the Integrated Character Segmenter/Recognizer Neural Networks (ICSRNN) recovery is performed in block 280. To prepare for this recovery, the starting and the ending coordinates corresponding to the width of the gap is defined. Next, if possible, it is determined the type of character to be recovered. Once the missing character is recovered using the ICSRNN the PR-IDCG is updated to include the newly recognized character. The complete details of the ICSRNN recovery are described later.

It is possible that even where a legitimate gap exists, the system is not able to detect the gap. But because several character recovery routines are performed during the IMPC recovery process, the missing character may be recovered during other recovery routines such as prefix-based recovery or suffix-based recovery.

The second recovery routine performed is the prefix-based recovery. Most of ID consists of two portions: an alphabet prefix and a digit suffix. While the digit suffix can vary from a single 1-digit character sequence to a 4-digit character sequence, the alphabet prefix is relatively constrained to a set of known prefix list. This recovery routine uses the list and tries to match and fit the alphabet prefix in a ID Candidate to one that is found in the prefix list. In general if a legitimate alphabet prefix can be found successfully from the image, there is a good chance of finding the rest of the characters of an ID because finding a prefix which matches the prefix list is a good indication that this ID string is indeed a part of a legitimate ID.

A dynamic matching is performed to fit the successive alphabet sub-sequences in the ID Candidate to the prefix list. A full match would of course be ideal and would indicate high likelihood of the ID Candidate being the actual ID. A matching criteria is used in the event of partial match. Each partially matched prefix would then form the candidate target prefix for ICSRNN recovery. This dynamic matching process can effectively identify possible insertion or deletion from prefix candidates. Here deletion means that a character was missing in the prefix candidate, insertion means that extra characters were produced in it. These two kinds of errors can be identified when there is only one insertion or one deletion.

For instance, if a prefix candidate is AP*U ("*" indicates a deletion) that is one character is missing. If APLU, APKU are valid prefix, after dynamic matching, both APLU and APKU are identified as possible prefix for this case. In the subsequent character recovery process, we are going to purposely recovery either L or K, we call this type of recovery as target character based recovery. Unlike previous invocation of ICSRNN in the other ID CANDIDATE-R, this recovery has target character information and can therefore afford to relax its ICSRNN constraint in the hope of recovering the hypothesized character. In the case of insertion, for instance, if a prefix candidate is APLLU, the first L is an insertion error, after DP, APLU will be identified as possible prefix. In this case no additional recovery is needed.

Figure 7:
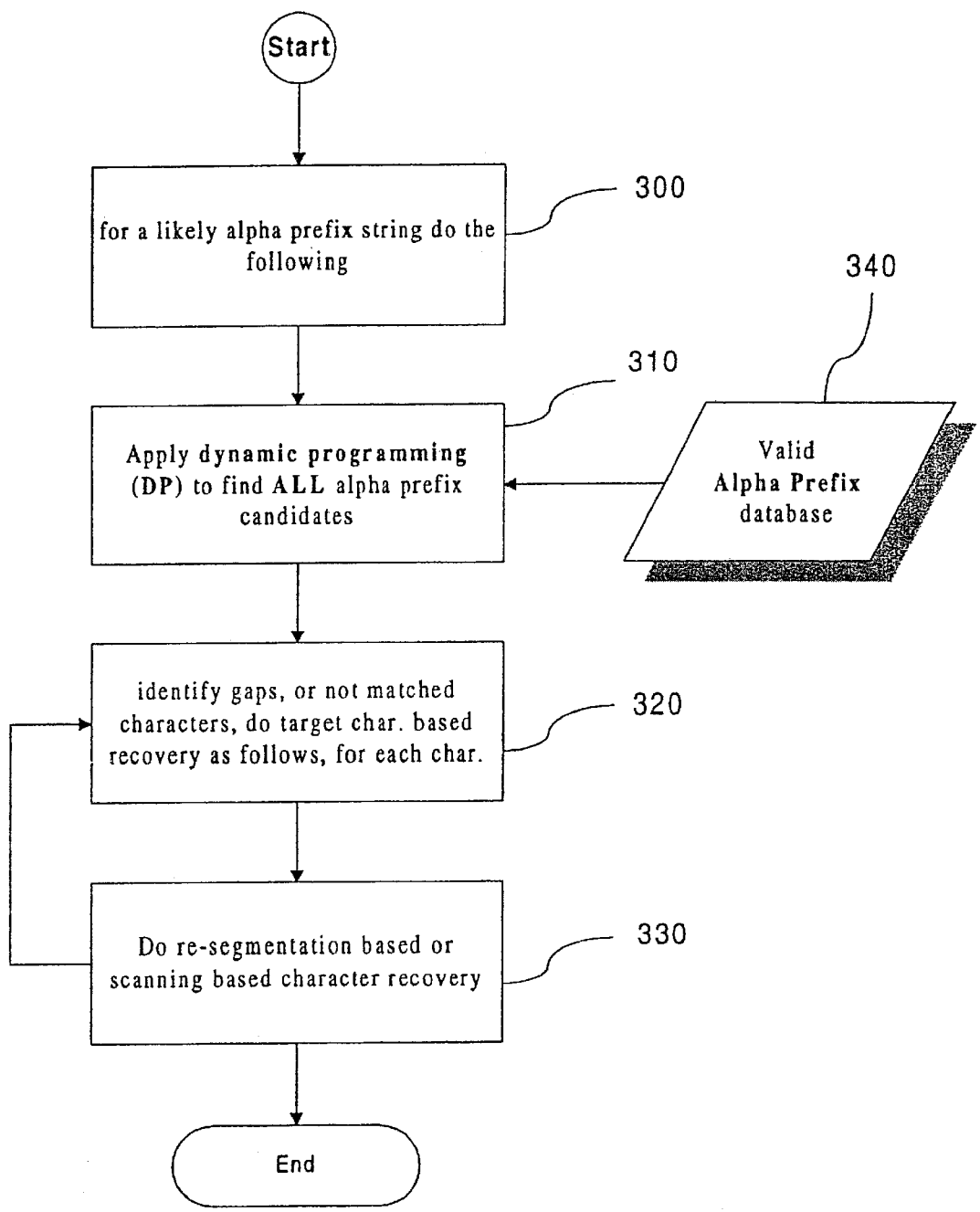
FIG. 7 is a flow diagram illustrating the sub-ID level alphabet prefix based character recovery routine.

FIG. 7 illustrates in detail the steps for the prefix-based recovery scheme. In block 300, the character group of the PR-IDCG containing the first three alphabetical characters are chosen for analysis. Of course, one skilled in the art should appreciate that the decision to choose the first three characters had everything to do with the particular layout of the license plate numbers in this jurisdiction where all license plate must start with one to three character long alphabetical prefix. Where in other jurisdictions the license plate numbers or other identification codes follow a different layout, the proper modifications should be made.

Note that even if one or two characters from that character group are obscured and not recognized, the system is able to identify and extract the group based on its position relative to the other character groups. So for instance, FIG. 15.3 illustrates a situation where one of the three characters is not recognized. In this case (hereinafter "case 1"), the last of the three characters in the prefix "JCL" is not recognized because the image of the third character, "L", was merged with a screw nut located close to the top of the character. Due to the abnormally height created by this distortion, the segmented pattern of the character "L" was eliminated. In another situation ("case 2", no figure but still using the example "JCL"), the middle character may not be recognized. And yet in another situation ("case 3", no figure but still using the example "JCL"), the first character may not be recognized. Still yet in another situation ("case 4", no figure but still using the example "JCL"), all three characters may be segmented but one of the characters may not be properly recognized.

In case 1, the system locates the first two alphabet characters, J and C, and will look for a third. In so doing, it will only search the area immediately adjacent to the other two characters at a distance approximately equal to the distance that the system assumes the distance should be based on the information provided for in the ID knowledge data base. When it is not able to find a character within the proper distance, it will be deemed that the third character is missing. The third character will, therefore, be the target of the recovery scheme.

In case 2, the system locates the first alphabet character J. It won't be able to find a second character within the allotted distance and will deem it to be missing. It will eventually find the third character L, and based on the knowledge that the character group should contain one to three alphabet characters, the distance the characters should be apart and the symmetry of the characters in the upper and lower rows, it will conclude that L belongs in the character grouping (though this conclusion will be reached in the layout-based recovery routine). But not having the second character to complete the group, it will become the target of the recovery scheme.

In case 3, the system will fail to find the first character, but will successfully locate and identify the second and third characters C and L. Based on the distance between L and B, it will conclude that they belong in the same character grouping. Based on the distance between the character L and the left edge of the plate and symmetry consideration, it will conclude that the first of the three characters is missing, and it will become the target of the recovery scheme.

In case 4, the system will find all of the characters, and hence, will not know immediately whether to conduct a recovery routine. However, as explained below, the prefix will most likely not match when compared against a target list, and so recovery routine would be performed.

After the character group has been selected, dynamic programming is applied in block 310 to select all possible characters which may fill the missing character so as to make the character group a valid prefix. Or in case 4, it is determined which of the characters may be misread. Each of these possible characters is called a prefix candidate. Of course, to determine what prefix is valid, database 340 must be provided containing all valid license plate number prefix. Having such a database 340 greatly reduces the number of candidates the system needs to consider, and will in turn, significantly reduce the overall time for recognizing the license plate number.

To select the prefix candidates, the known characters of the character group are matched up against the list of all possible valid prefix. Where there is a match, the character which makes the character group a valid prefix becomes a prefix candidate. The prefix itself which results from the matching of the prefix candidate is called the prefix hypothesis. So using case 1 above as a sample, if the dynamic programming uncovers 4 prefix hypotheses JCL, JCK, JCH, then JCX, then the list of possible candidates for the missing third character is reduced to four characters L, K, H, and X, called alpha prefix hypothesis, rather than the entire alphabet.

For case 4, if the prefix JCL was misread as JCZ then all characters which cannot be part of the valid prefix are reconsidered. So for instance, if the prefix database contains valid prefix JCL and KCZ but no other containing these letters, then both the letters J and L will be revisited. It is possible that depending on the situation, all three characters may be revisited.

So in block 320, either the gap or the unmatched character is identified. In block 330, the gap or the unmatched character is either resegmented using the secondary segmenter or the scan-based character recovery routine is performed. Once the missing character is recovered, the PR-IDCG is updated to include the recovered character.

There are two basic objectives for the digit suffix based ID character recovery: to form a complete a digit suffix (comprising one to four digit number) and also to recover the check alphabet character (a single alpha character) which may or may not be present.

To make complete a digit suffix requires the system to fit the digit sub-sequence in the ID candidate to a valid digit suffix format: a contiguous string of digits followed by a check alphabet. If the ID candidate string is only predominantly composed of digits, then it will hypothesize that this should indeed be a contiguous digit suffix string, and embarks to digitize any non-digit character. It does this by first invoking a digit recognizer for a new recognition call, enforcing the return classification to be the best of the 10 possible digits. Also, if the digit suffix string is not tailed by an alphabet character, it invokes a ICSRNN search right to look for one.

Figure 8:
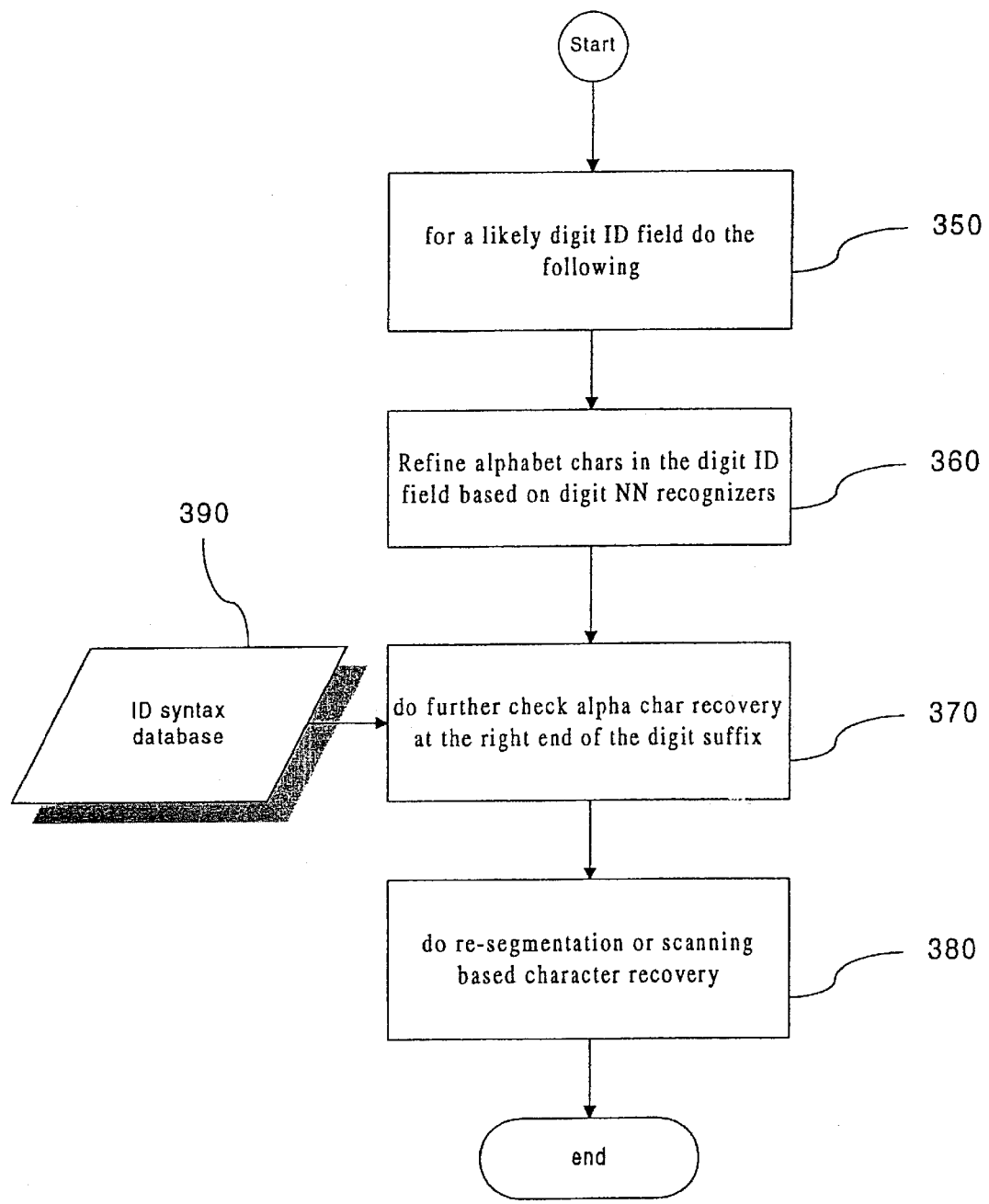
FIG. 8 is a flow diagram illustrating sub-ID level digit suffix based character recovery routine.

FIG. 8 illustrates in detail the steps for the digit suffix-based recovery scheme. Although not absolutely necessary, it is strongly preferred that the suffix-based recovery is done after the prefix-based recovery because finding the prefix can greatly assist in recognizing the suffix portion of the ID. Moreover, the prefix portion is easier to find because the prefix database contains a list of all valid prefix, making the recognition process easier.

It is first determined in block 350 whether a likely a digit suffix exists. In determining this inquiry, a number of factors are considered including whether a valid prefix is found, whether any digit characters are properly segmented and recognized, the relative spatial relationship between the prefix and the potential suffix characters, number of characters segmented, etc. In determining the spatial relationship between the prefix and the suffix, the system considers both the possibilities that the prefix and the suffix may either be on two rows or in a single row. However, in either case, it is assumed that the prefix will come before the digit suffix.

In block 360, a refined recognition is performed. In the initial segmentation and recognition process, the digit portion is recognized using the alphanumeric neural network (NN1-AD). The NN1-AD, while has the advantage of being capable of handling both the alpha and numeric characters, has the disadvantage of sometimes failing to distinguish between alpha and numerical characters which are very similar. For instance, the NN1-AD may interpret an "8" as a "B". The numerical neural network (NN1-A), on the other hand, while capable of only recognizing numbers, can better recognize numerical characters. For this reason, once the likely digit field is located in block 350, the field is refined or "digitized" using NN1-A to convert any numerical characters which may have been misinterpreted as an alpha character.

Once the digit suffix has been digitized, the system looks to the right of the suffix to locate the alpha character in block 370 and utilizing the ID knowledge provided for in the ID syntax database 390. Based on the rule of symmetry, and other considerations, the alpha character or a digit suffix character is missing, the resegmentation or scanning based recovery is performed in block 380.

Figure 9:
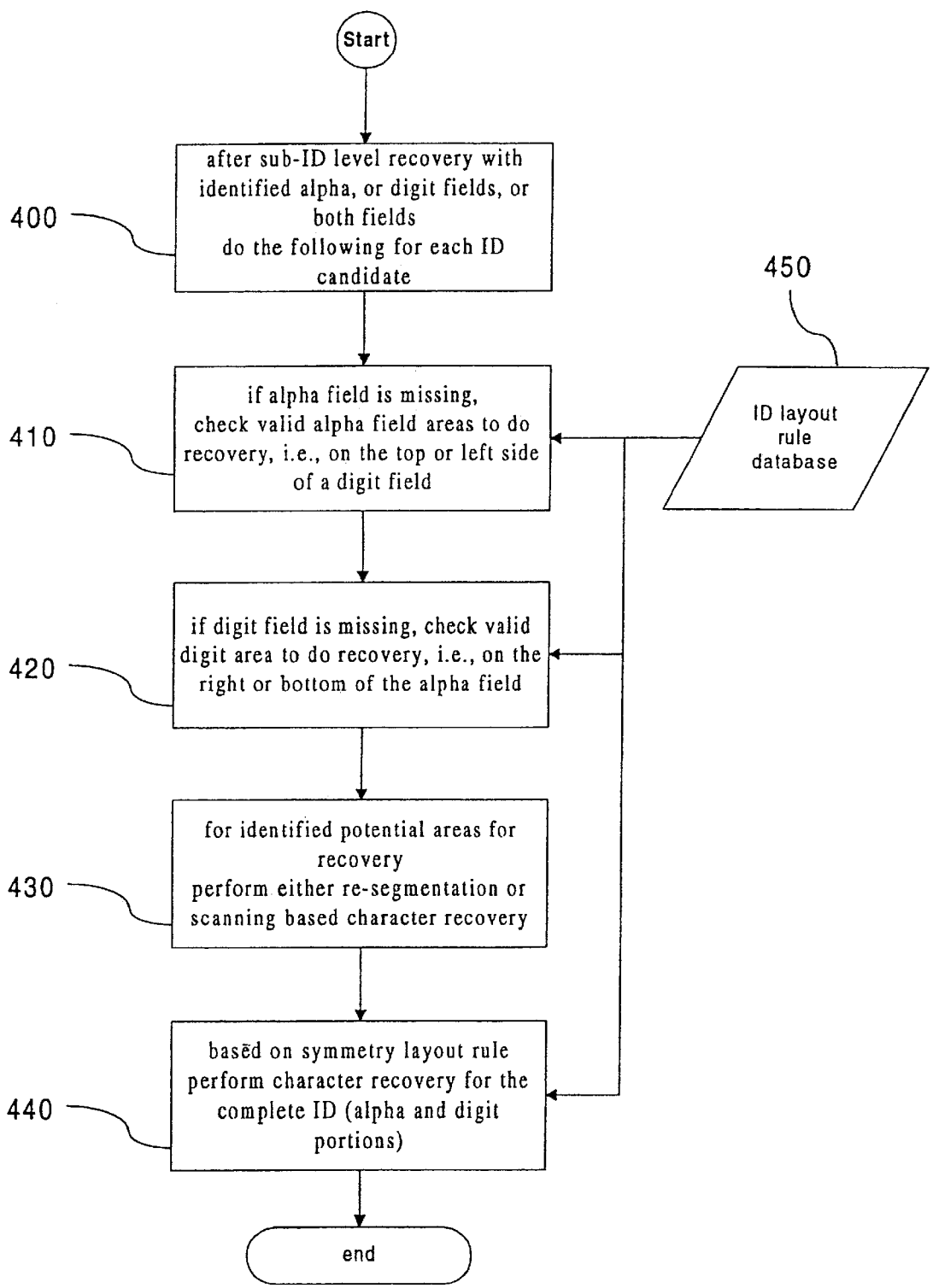
FIG. 9 is a flow diagram illustrating the ID-level format/layout based character recovery routine.

Referring now to FIG. 9, the input to the format/layout based ID character recovery is ID Candidates as shown in block 400. This recovery is performed at the ID level, and basically the system checks if both alpha prefix and digit suffix are present in block 410, and if one of them is missing as determined in blocks 410 and 420, then, based on spatial layout rules, re-segmentation or scanning based recovery procedure is invoked in block 430 to look for the missing portion of the ID.

For instance, if the prefix portion is missing, the system can look it up from the left side or top side of the digit suffix. Or, if the digit suffix is missing, then it can look it up from the right side or lower side of the alpha prefix. This spatial location information is provided by the ID layout rule database 450, the information obviously depending on the ID format standard of the given jurisdiction.

After the two portions of an ID have been located, further recovery is performed based on spatial symmetry of the ID layout in block 440. It helps to identify the cases where one or more characters are missing at either right or left sides of ID. As soon as It is identified that one or more characters are missing, either re-segmentation or scanning based recovery is invoked.

To illustrate the steps above, FIG. 15.4 illustrates an image of the license plate with the number JCL1749 with the JCL in the top row and 1749 in the bottom row. The ROI properly captured the top row and the characters JCL have been properly segmented and recognized. However, the ROI only partially captured the bottom row and hence the characters 1749 were not initially properly segmented or recognized. But as can be seen in FIG. 15.5, the system applied the layout rule that a second row should be present and was able to properly segmented at least the first three characters, 174, from the second row. Then further applying the rule of symmetry, the last character, 9, was finally segmented and recognized in FIG. 15.6.

Figure 10:
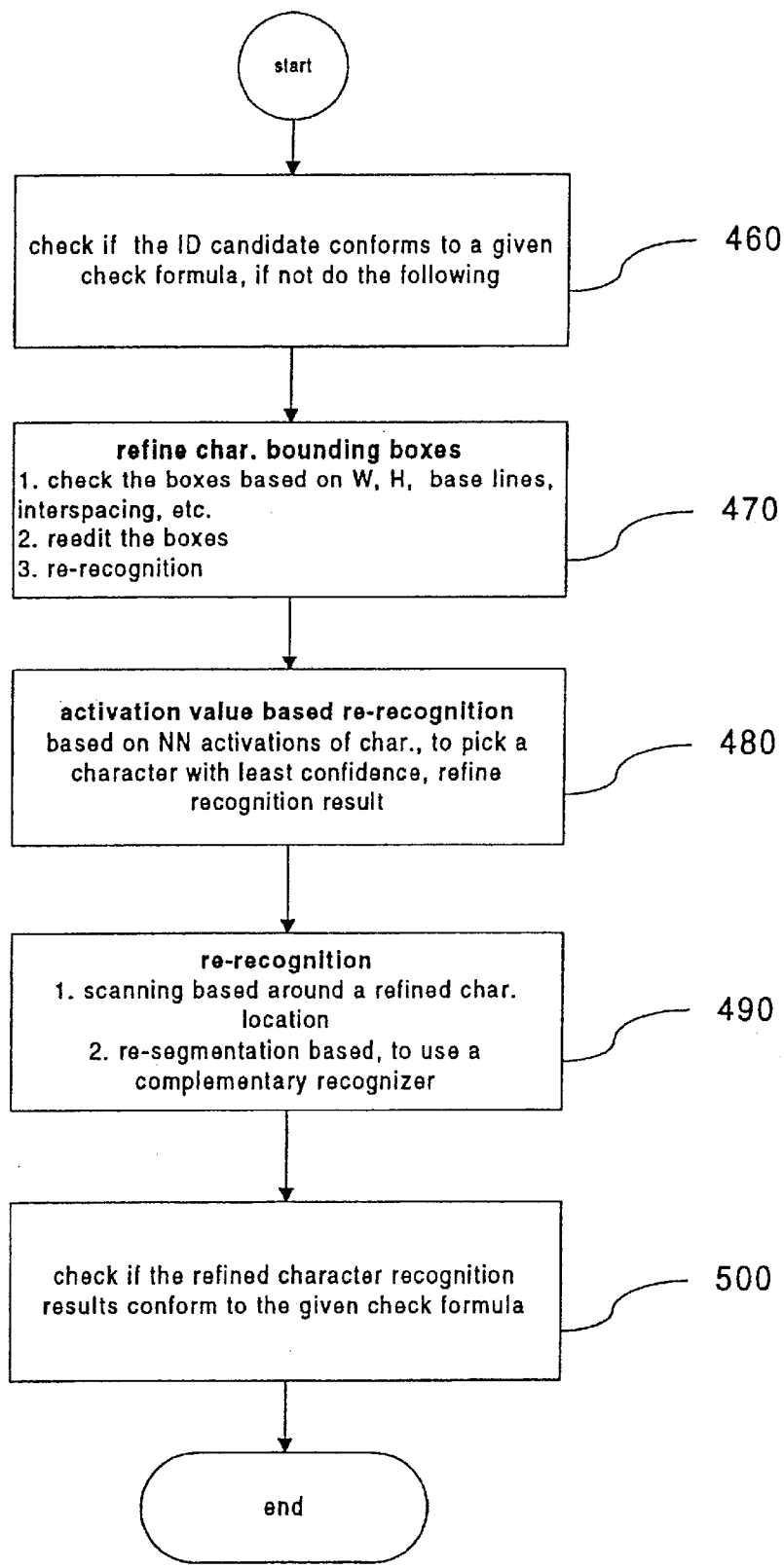
FIG. 10 is a flow diagram illustrating the ID-level ID check formula based character recovery routine.

Referring now to FIG. 10, the last recovery routine is based on check formula. In certain jurisdictions, to help check if a given ID is correct, various algorithms are used to formulate an ID character string so that the summation of all ascii values of all the characters in an ID equals a certain unique constant. Based on this principle, for a completed ID the system can check if the ID conforms to the check formula; if it does not, a further examination is needed.

When a failure is detected during a check formula examination in block 460, the following procedures are invoked: character bounding box reediting (block 470), activation value based re-recognition (block 480), and re-recognition (block 490).

In block 470, the basic idea is to check the all bounding boxes of the characters in terms of their height, width and inter-character spacing, top and bottom baselines. Since the character bounding boxes are mostly generated on individual characters in the character segmentation process, they may not be very accurate. Based on the careful examination more consistent character bounding boxes can be obtained in hoping to refine the ID reading results. After refining the boxes all characters are re-recognized again in block 490, and hopefully this time the check formula examination can be successfully passed in block 500.

In block 490, the examination is based on the activation values of neural network outputs of the characters. The system will identify one or two characters with lowest confidence activation values, and then for these characters it can perform either scanning based recovery or re-segmentation based recovery in block 490 to see if the newly recognized characters can satisfy the check formula examination in block 500.

Figure 11:
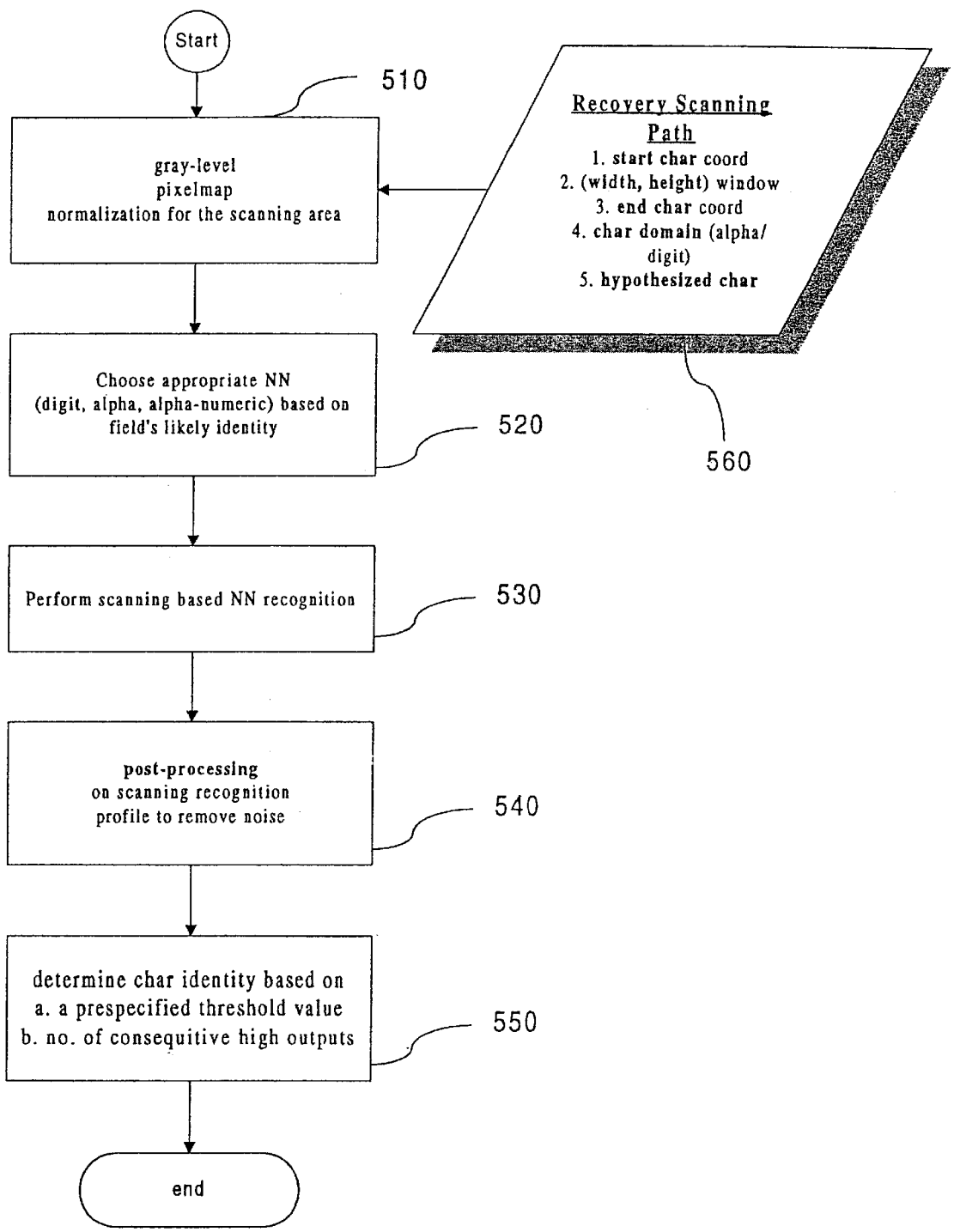
FIG. 11 is a flow diagram illustrating the method used by the Integrated Character/Segmenter/Recognizer Neural Network (ICSRNN) to perform scan-based recovery.

Now referring to FIG. 11, the ICSRNN is a generic module that every ID character recovery routine utilizes. Several important parameters pertaining to the image path to be scanned must be set first before the ICSRNN can run effectively. The ICSRNN has some flexibility in that it can react to the information learned during the ID character recovery routines such as whether the character to be scanned is a digit/alphabet (in the case of digit suffix ID character recovery, it will invoke the digit/alphabet dedicated neural recognizer accordingly), or the identity of the character hypothesized (in the case of alphabet prefix ID character recovery).

As it scans across the prepared image strip, it logs down the recognition response across all possible recognition output nodes. This keeps track of the recognition profile over the image strip. The work of post-processing is to remove noise and to determine the likely character that is scanned. There is no explicit segmentation and recognition phase in this scanning based recovery process, and therefore, it is very useful when characters are merged with each other or with other objects in the images, or when the characters are broken. In all of these cases, it is very difficult to segment individual characters from the image pixel maps.

FIG. 11 illustrates the steps employed by the Integrated Character Segmenter/Recognizer Neural Networks (ICSRNN). Before the scanning is initiated, the ICSRNN is supplied with the information gained during the Recovery Scanning Path process 560 which is performed during the ID character recovery. This information would include coordinates for the starting character, the width and height of the window, the coordinates for the ending character, the character domain, i.e. whether the character is alphabetic or numeric, and the hypothesized character, if any.

First, in block 510, the gray-level pixelmap of the image is normalized. In block 520, it is determined whether the character to be read is known to be a numeric or alphabetic. If it is known that it is numeric, such as when reading the digit suffix portion of the license plate number, then the scanning is done through the digit neural network. If the character to be read is known to be alphabetic then the alphabetic neural network is used. If, on the other hand, the character to be read could be either alphabetic or numeric, then the scanning is done via the alphanumeric neural network. When the scanning is completed in block 530, the scanning recognition profile is logged in memory. After the scanning recognition profile has been logged, the profile is processed in block 540 remove noise. Once processed, the identity of the character is determined in block 550 based on the recognition profile. In doing so, the system looks to see if there is profile meets a certain pre-specified threshold value or whether there is a number of consecutive high outputs. If a hypothesized character is given, however, a different threshold value and number of high output requirement can be used because, in a sense, the systems relaxes the requirement a bit.

Figure 12:
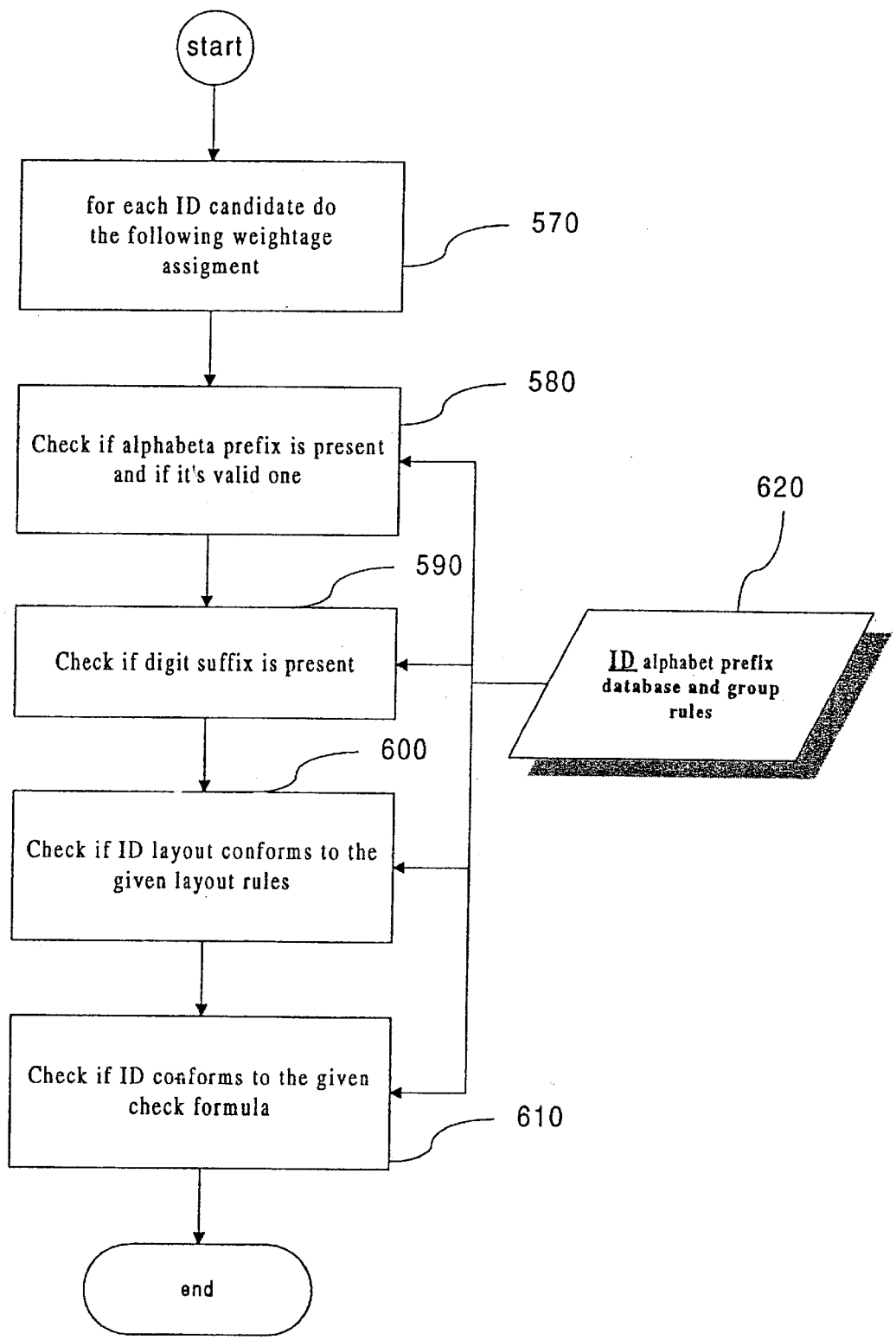
FIG. 12 is a flow diagram illustrating the method for assigning weightage to ID Candidates to select the ID Candidate which is most likely the true ID.

Now referring to FIG. 12, the process of assigning weights to all ID Candidates in the ID Candidate List entails ranking all the ID Candidates from the ID Candidate list to choose the ID Candidate with the highest weight, which is most likely the most complete ID. Specific measures that are used to increase the overall weightage of an ID Candidate include whether the alphabet portion of the ID conforms to a valid alphabet prefix found in the prefix list, whether the entire ID string conforms to the syntactic and positional layout format, and whether the entire ID conforms to the check formula.

If it is found that even the top choice from the ID Candidate list is far from being a complete ID, then, it indicates that further recovery is needed, and appropriate image enhancement or ROI routine is performed, or whole image segmentation is performed again in Block 110 of FIG. 1.

FIG. 12 illustrates in detail the steps for assigning weight to the ID Candidates. An ID Candidate is provided in block 570. It is then determined whether a valid alphabet prefix is found in block 580 and whether a valid digit suffix is found in block 590. In block 600, the system checks to see that the ID conforms to the layout rules of a valid ID. Then in block 610, it is determined whether the ID conforms to the given check formula. For each time a test is passed, an incremental weight is assigned. The ID Candidate having the highest weight is ranked highest and is deemed to be the candidate which is most likely the valid ID.

Figure 13:
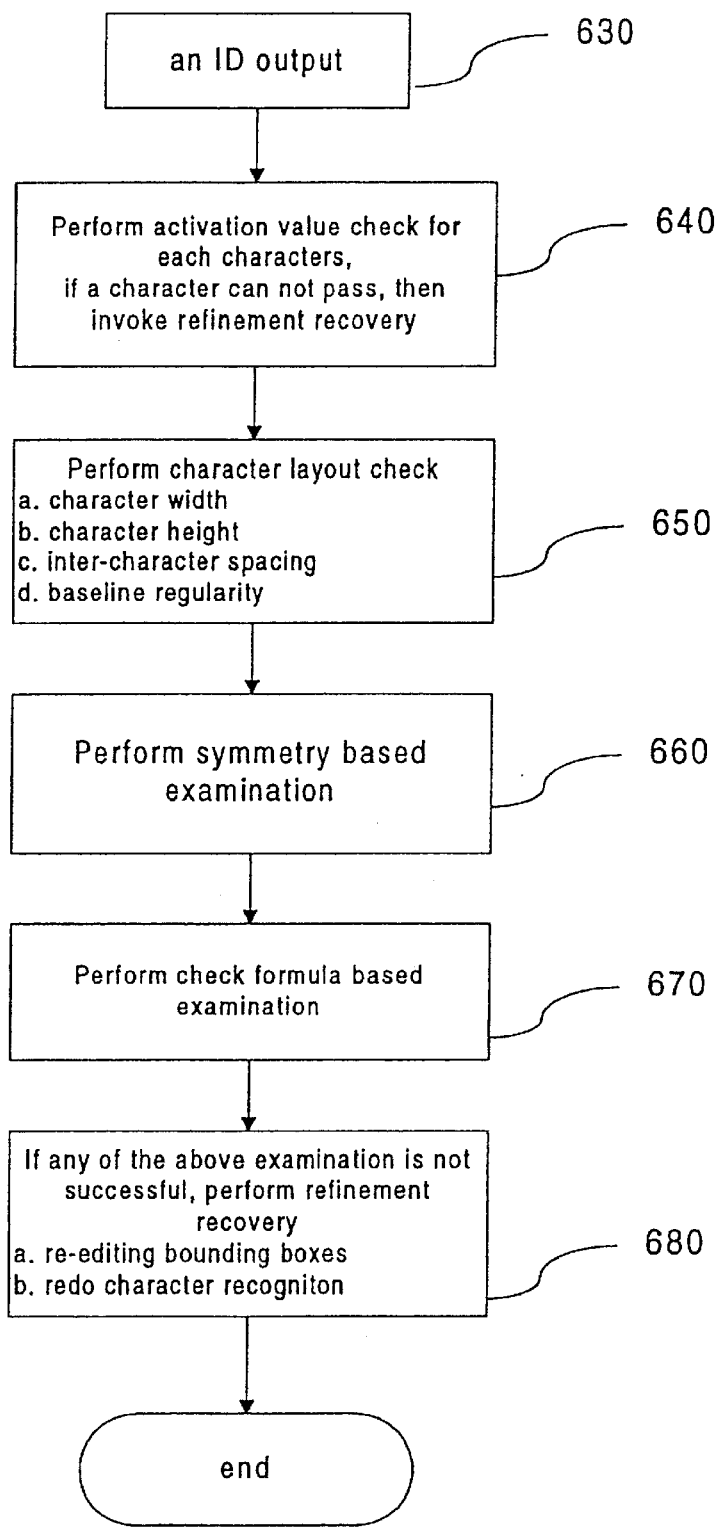
FIG. 13 is a flow diagram illustrating the method for measuring the confidence level of an ID output.

Now referring FIG. 13, this figure illustrates the steps for measuring the confidence level of an ID output, block 630. In this stage, an examination is conducted to ensure the recognition accuracy. There are many criteria such as activation values of recognition results of neural network recognizers, spatial layout regularities, etc. The main goal of these confidence measures is to reduce the Ppass-wrong rate while maintaining a low Preject-wrong rate, the definitions of which shall be discussed below.

There are two types of examinations: character layout based, block 650, and recognition based, block 640. In the layout based examination character's widths and heights are examined so that all characters of the output ID have consistent values. Also, the baselines on both top and bottom horizontal boundaries of all characters are checked for consistency. Special care has to be taken for some characters such as I and 1 which have narrow widths. Furthermore, the system also checks if the ID conforms to the symmetry constraints in block 660, and whether the ID conforms to the check formula in block 670. In all the above cases, if the ID output cannot pass the examination, corresponding actions can be taken to make appropriate character bounding box refinement in block 680. After the refinement, the ID will be re-examined until it either passes the examination or is rejected.

In the recognition based examination, the activation values of the ID characters have to be higher than a pre-specified threshold value, i.e., 0.8. Also the activation value of the neural network outputs for all characters in the output ID has to be sufficiently larger than the second largest response of the corresponding characters. This is to ensure that the neural network's output indeed indicates a correct recognition result, because if first two largest outputs of the neural networks for a given input pixel map do not have enough difference, it indicates a low confidence because ideally only one output node of the neural network should have a large value. If some of the characters cannot pass the recognition activation value examination, then a similar character bounding box re-editing can be performed.

If the ID output can pass all the above confidence measure it will be outputted by the reading system as an ID output; otherwise, the system will output a rejection signal which indicates that the reading system has no confidence to output a reading result, and human help is needed.

System Performance Measures

The following performance measures are used to indicate the integrity of the system:

Ppass—percent of the cases where the ID reading system outputs an ID.

Preject—percent of the cases where the ID reading system failed to output an ID either due to lack of confidence to the recognized ID or could not get an ID at all, hence we have Ppass+Preject=1.0.

Ppass-right—percent of the cases among all the output IDs how likely the IDs are correct.

Ppass-wrong—percent of the cases among all the output IDs how likely the IDs are wrong, hence we have Ppass-right+Ppass-reject=1.0. For rejected cases, we also have:

Preject-right—percent of the cases among all rejected cases where a) no complete ID is generated due to various reasons, b) the recognized ID is not the real ID in the images.

Preject-wrong—percent of the cases among all rejected cases where the recognized ID is wrongly rejected, i.e, the recognized ID is indeed the ID in the images, but, due to confidence measure is too strict it was rejected wrongly.

The performance measures, Ppass and Preject, indicate how likely the system will output a reading result. In general, Ppass rate should be high enough, otherwise, the system is not too useful. However, it should be pointed out that a high Ppass rate does not mean a good system performance because the output ID can be wrong. Therefore, other additional performance measures are used to measure the accuracy of the output.

In an ideal system, the best performance would be Ppass=100%, Ppass-right=100%, no rejection. But, in practice, this is impossible. But it is generally desirable to have a system with a high Ppass, Ppass-right, and a low Preject-wrong. It should be pointed out that when you increase Ppass rate, Ppass-wrong can be increased too. Also, when you increase Ppass-right rate, you risk increasing Preject-wrong rate.

The key to increasing Ppass rate is to do extensive recovery so that the system can successfully read the IDs. To achieve a high Ppass-right rate it is important to have a good confidence measure to accept all the right output ID and reject all the wrongly recognized IDs. Based on individual application requirements, i.e., the cost of two types of errors-outputting a wrong ID or failing to output an ID-appropriate balance should be determined. Again, it should be pointed out the importance of the confidence measure module. It is like human reading process: during one's reading process one may feel that a second look is needed when he or she is not certain what he or she has seen. Similarly, during the confidence measure process, the system tests the output based on various reading results to determine if the system is certain or confident of the recognition.

EXAMPLES

The following are some examples of real images taken of car license plates which illustrate some of the real-world difficulties in recognizing the characters and the ways in which the present recognition system can handle the various situations.

FIG. 14.1 shows basically a good image of a license plate. However, due to the presence of nut and screws on the plate, the characters A and 8 are merged with the background, and hence, the primary segmenter will not be able to properly segment these characters. However, these characters will be recovered during the gap based character recovery routine.

FIG. 14.2 shows an image of a license plate where some of the characters are merged together. Note that here, the images of the characters 313 are merged together. This will prevent the primary segmenter from properly segmenting these characters. Hence, only the characters SBY 7P will be recognized and leaving a large gap in between SBY and 7P. Here, the ICSRNN will be invoked during the gap based recovery routine to recover the merged characters.

FIG. 14.3 shows an image of a license plate having a typical broken character. Note that here, the number 8 is partially broken. Although conventional stroke-featured based recognizers would have difficulty recognizing a broken character such as in this case, the neural network based recognizers such as the ones employed in the present invention, handle this type of situation well.

FIG. 14.4 shows an image of a license plate where a character is not properly captured by the image. Note that here the first character S is at the extreme left boundary of the image causing the primary segmenter to capture only BW1437Y. During the prefix based recovery, the system will recognize that the prefix BW, by itself, is incomplete. Hence, by hypothesizing the possibilities SBW, QBW, PBW, etc, it will eventually capture SBW.

FIG. 14.5 shows an image of a license plate displaying a distorted character. Note the distortion in the letter V. Through the prefix based and check formula based recovery routines, the letter V will be recovered.

FIG. 14.6 illustrates another example of distorted or damaged characters. Note the damage to the letter D and the number 2. Both of these cases can be handled by the neural network based recognizers.

FIG. 14.7 illustrates a case where most (if not all) of the characters are missing after the preliminary segmentation because they are merged with the license plate outline. Upon sensing the drastic absence of the segmented characters, a new segmentation pipeline will be invoked with morphological preprocessing on the image to remove the plate outline but leaving the characters intact. Subsequently, all of the characters are easily segmented and recognized.

FIG. 14.8 illustrates a situation where problem occur due to poor or non-uniform contrast in the characters. The system has to decide against imposing contrast uniformity constraint in light of achieving good segmentation results.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims and all changes which come within the meaning and range of equivalency of the claims are, therefore, to be embraced therein.

We claim:

1. A robust method of recognizing a license plate ID of a vehicle, the license plate ID containing a plurality of characters, the method comprising:
    producing an image of at least a portion of the vehicle, said image containing the license plate ID:
    selecting a region of interest of said image, said region of interest containing at least a portion of said license plate ID;
    segmenting at least some characters of said license plate ID;
    recognizing at least some of said segmented characters using a recognizer to produce recognized characters;
    groping said recognized characters to form partially recognized ID character groups;
    recovering at least one character which was not successfully recognized if any characters were not successfully recognized;
    forming an ID candidate list containing ID candidates formed from said partially recognized ID character groups and any recovered characters, said ID candidates having at least one difference in characters;
    selecting an ID candidate from said ID candidate list which is most likely to be a legitimate ID based on predetermined factors, said ID candidate being an ID output;
    measuring a confidence level of said ID output; and
    determining a result of performing at least one step of the method, determining the acceptability of the result and, if the acceptability determination indicates that the result is unacceptable, reperforming the at least one step of the method using an alternative tool.

2. The robust method of recognizing a license plate ID of a vehicle as recited in claim 1 wherein said recovery step at the sub ID level utilizes the following recovery schemes: gap/spacing based, prefix based and digit suffix based, and at the whole ID level utilizes the following recovery schemes: layout based, and check formula based.

3. The robust method of recognizing a license plate ID of a vehicle as recited in claim 2 wherein said gap/spacing based recovery scheme comprises:
    providing partially recognized characters as an input;
    identifying gaps resulting from mis-segmentation;
    performing resegmentation; and
    performing a scanning based recovery if said resegmentation is not successful.

4. The robust method of recognizing a license plate ID of a vehicle as recited in claim 2 wherein said prefix based recovery scheme comprises:
    providing a likely alpha prefix string;
    applying dynamic programming to find all alpha prefix candidates;
    identifying gaps or mismatched characters;
    hypothesizing for the gaps or mismatched characters; and
    conducting resegmentation based or scan based character recovery.

5. The robust method of recognizing a license plate ID of a vehicle as recited in claim 6 wherein said digit suffix based recovery scheme comprises:
    providing a likely digit ID string;
    refining characters in said digit string using a digit neural network based recognizer;
    checking for at least one alpha character to a right of said digit string; and
    conducting resegmentation or scanning based recovery.

6. The robust method of recognizing a license plate ID of a vehicle as recited in claim 2 wherein said layout based recovery scheme comprises:
    providing ID candidates as input;
    identifying a missing field;
    conducting a recovery for the missing field; and
    conducting a character recovery for the license plate ID based on a symmetry layout rule.

7. The robust method of recognizing a license plate ID of a vehicle as recited in claim 2 wherein said check formula based recovery scheme comprises:
    providing ID candidates as input;
    refining character bounding boxes for said ID candidates;
    conducting activation based re-recognition;
    conducting re-recognition; and
    verifying said check formula.

8. The robust method of recognizing a license plate ID of a vehicle as recited in claim 1 wherein said selecting an ID candidate comprises:
    providing ID candidates;
    checking for an alpha prefix for each candidate;
    checking for a digit suffix for each candidate;
    verifying layout rules for each candidate;
    verifying check formula for each candidate;
    assigning a weight based on a result of said checks and verifications; and
    selecting an ID candidate having a highest weight.

9. The robust method of recognizing a license plate ID of a vehicle as recited in claim 1 wherein said measuring of confidence level step comprises:

providing an ID output;

performing an activation value check for each character of said ID output;

invoking refinement recovery if said activation value check fails;

performing a character layout check;

performing a symmetry based examination;

performing a check formula based examination; and performing refinement recovery if any step above fails.

10. The method as claimed in claim 1 wherein the selection of the region of interest is performed using one of a plurality of tools and reperformed using an alternative tool if the result is unacceptable.

11. The method as claimed in claim 1 wherein the segmenting step is performed using one of a plurality of segmenters and reperformed using an alternative segmenter if the result is unacceptable.

12. The method as claimed in claim 1 wherein the result to be determined is if the confidence level is higher than a predetermined level and, if not, at least one of the steps of selecting a region of interest and segmenting at least some of the characters is reperformed using an alternative tool.

13. The method as claimed in claim 1 further comprising grouping segmented characters to form potential character groups, wherein the determining a result is performed if more than a predetermined number of potential character groups are identified and, if not, at least one of the steps of selecting a region of interest and/or segmenting at least one of the characters are reperformed using an alternative tool.

14. A method as claimed in claim 1 wherein the steps of the method are applied to a grey scale image.

15. A method as claimed in claim 1 wherein the recovering step is performed both at a sub ID level and at a whole ID level.

16. A robust method of recognizing an ID on a surface comprising:

producing an image containing at least a portion of the surface;

selecting a region of interest of said image, said region of interest containing at least a portion of said ID;

segmenting at least some characters of said ID;

recognizing at least some of said segmented characters using a recognizer to produce recognized characters;

grouping said recognized characters to form partially recognized D character groups;

recovering at least one character which was not successfully recognized if any characters were not successfully recognized;

forming an ID candidate list containing ID candidates formed from said partially recognized ID character groups and any recovered characters, said ID candidates having at least one difference in characters;

selecting an ID candidate from said ID candidate list which is most likely to be a legitimate ID based on predetermined factors, said ID candidate being an ID output;

measuring a confidence level of said ID output; and determining a result of performing at least one step of the method, determining the acceptability of the result and, if the acceptability determination indicates that the result is unacceptable, reperforming the at least one step of the method using an alternative tool.

17. A robust method of recognizing a license plate ID of a vehicle, comprising:

producing an image of at least a portion of said vehicle, said image containing the license plate ID;

segmenting at least some characters of said ID;

recognizing at least some of said segmented characters using a recognizer to produce recognized characters;

grouping said recognized characters to formally recognized ID character groups;

recovering at least one character which was not successfully recognized if any characters were not successfully recognized, the recovery step being performed at a sub-ID level and at a whole ID level by gap/spacing based, prefix-based and digit suffix based recovery tools at the sub-ID level and layout based and check-formula based tools being the whole ID level;

forming an ID candidate list containing ID candidates formed from said partially recognized ID character groups and any recovered characters, said ID candidates having at least one difference in characters;

selecting an ID candidate from said ID candidate list which is most likely to be a legitimate ID based on predetermined factors, said ID candidate being an ID output;

measuring a confidence level of said ID output; and accepting said ID output as a license plate ID if said confidence level is acceptable.

18. A method as claimed in claim 17 wherein the recovery is performed at the sub-ID level before being performed at the whole ID level.

19. A method as claimed in claim 17 wherein multiple iterations of the recovering step are performed on the partially recognized ID character groups.

20. A robust method of recognizing a license plate ID of a vehicle, comprising:

producing an me of at least a portion of said vehicle, said image containing the license plate ID;

selecting a region of interest of said image, said region of interest containing at least a portion of said ID;

segmenting at least some characters of said ID;

recognizing at least some of said segmented characters using a recognizer to produce recognized characters;

grouping said recognized characters to form partially recognized ID character groups;

recovering at least one character which was not successfully recognized if any characters were not successfully recognized;

forming an ID candidate list containing ID candidates formed from said partially recognized ID character groups and any recovered characters said ID candidates having at least one difference in character;

selecting an ID candidate from said ID candidate list which is most likely to be a legitimate ID based on predetermined factors, said ID candidate being an ID output, and determining a result of performing at least one step of the method, determining the acceptability of the result and if the acceptability determination indicates that the result is unacceptable, reperforming the at least one step of the method in an alternative way.

* * * * *

UNITED STATES PATENT AND TRADEMARK OFFICE
CERTIFICATE OF CORRECTION

PATENT NO.     : 6,339,651 B1
DATED          : January 15, 2002
INVENTOR(S)    : Q. Tian et al.

It is certified that error appears in the above-identified patent and that said Letters Patent is hereby corrected as shown below:

<u>Column 23,</u>
Line 50, "groping" should be -- grouping --.

<u>Column 26,</u>
Line 8, "formally" should be -- form partially --.
Line 36, "me" should be -- image --.

Signed and Sealed this

Seventeenth Day of December, 2002

JAMES E. ROGAN
*Director of the United States Patent and Trademark Office*